June 7, 1966   K. EICKMANN   3,254,489
COMBUSTION ENGINE OF THE ROTARY VANE TYPE
Filed July 6, 1961   10 Sheets-Sheet 1
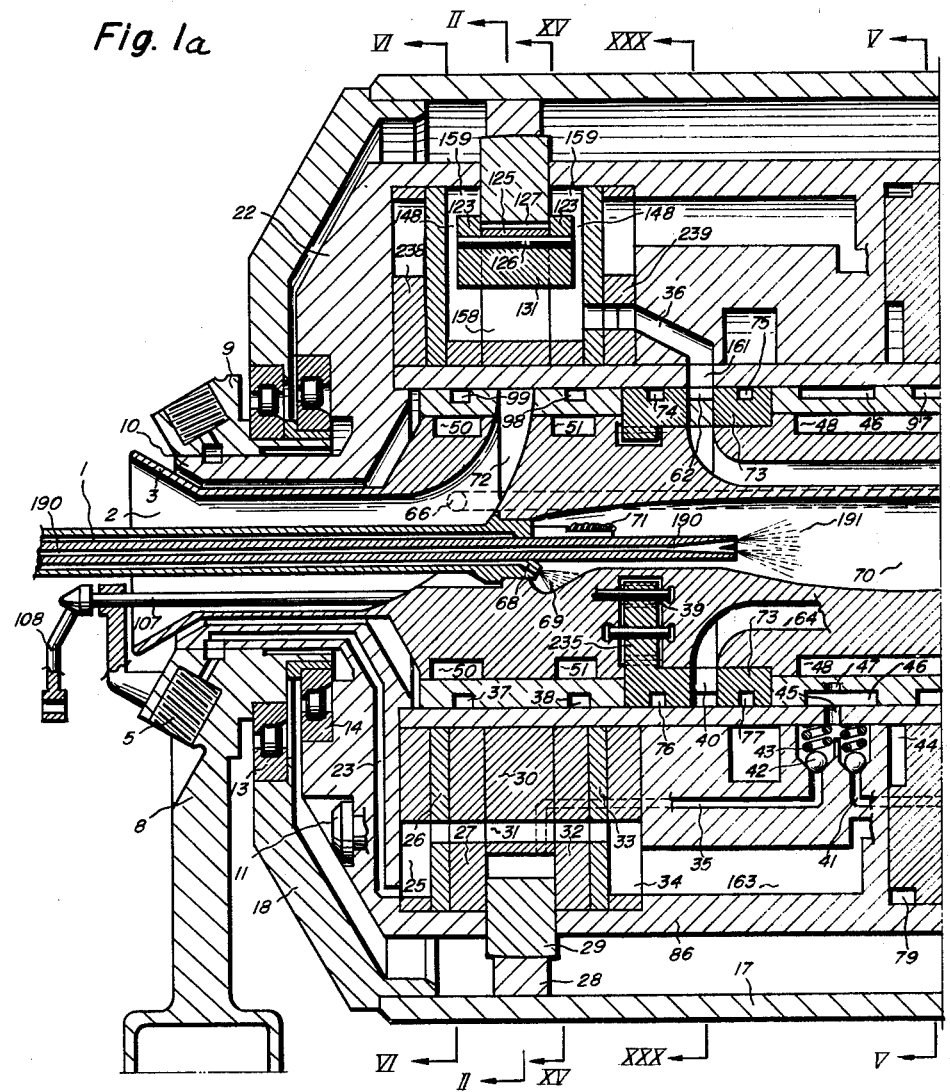
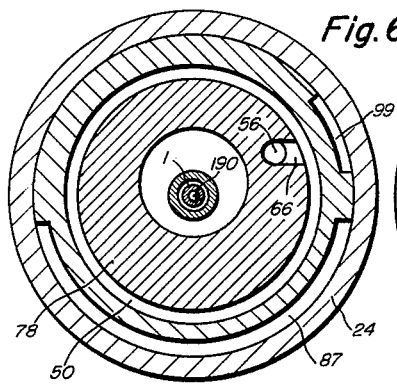
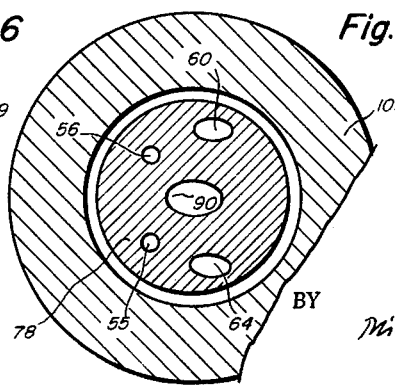
INVENTOR.
KARL EICKMANN
BY
Michael J. Striker June 7, 1966  K. EICKMANN  3,254,489
COMBUSTION ENGINE OF THE ROTARY VANE TYPE
Filed July 6, 1961  10 Sheets-Sheet 2
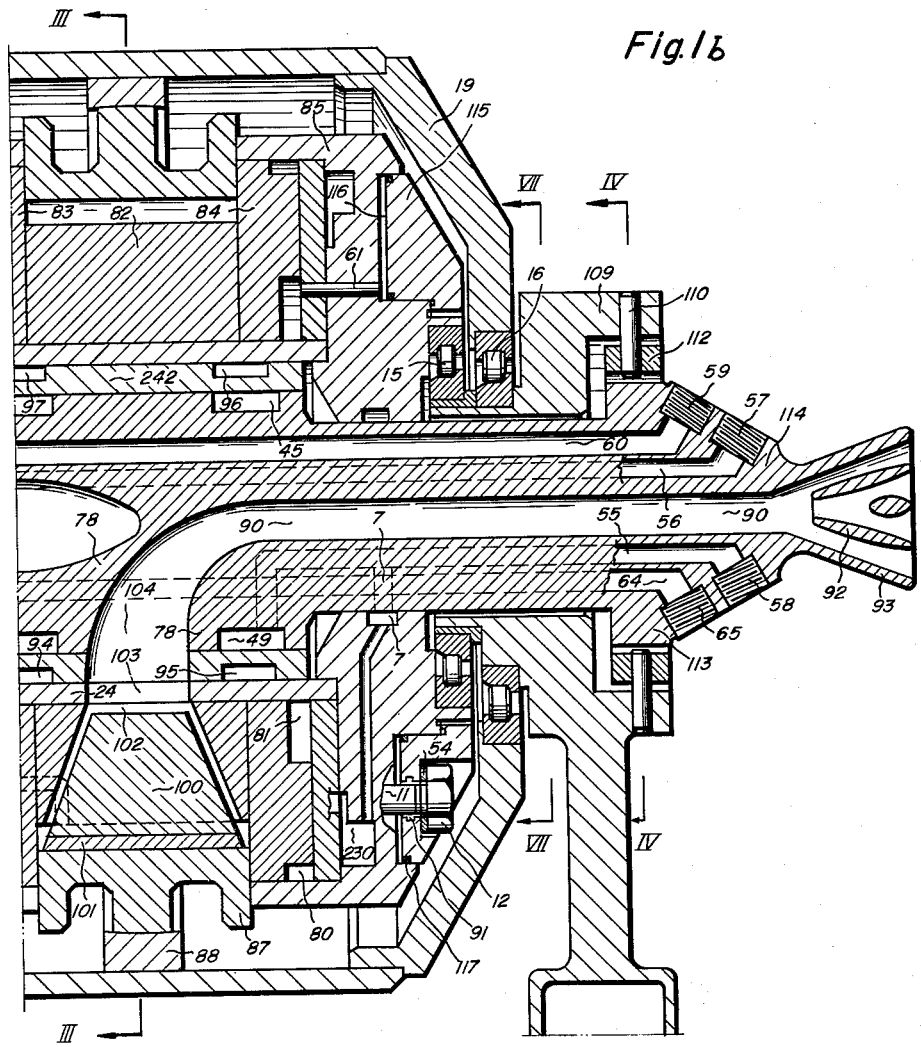
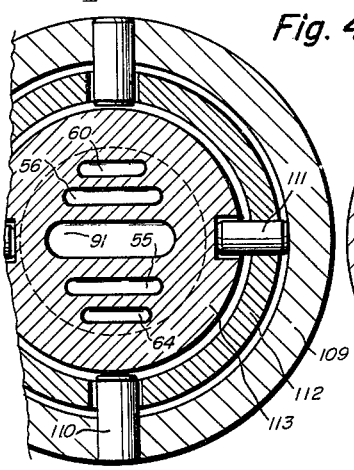
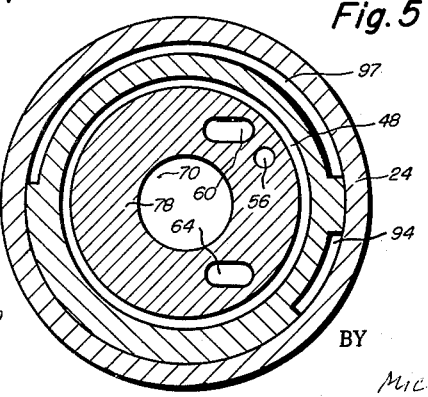
INVENTOR.
KARL EICKMANN
BY June 7, 1966 K. EICKMANN 3,254,489
COMBUSTION ENGINE OF THE ROTARY VANE TYPE
Filed July 6, 1961 10 Sheets-Sheet 3

INVENTOR.
KARL EICKMANN

June 7, 1966  K. EICKMANN  3,254,489
COMBUSTION ENGINE OF THE ROTARY VANE TYPE
Filed July 6, 1961  10 Sheets-Sheet 4

INVENTOR.
KARL EICKMANN
BY
Michael J. Striker

June 7, 1966     K. EICKMANN     3,254,489
COMBUSTION ENGINE OF THE ROTARY VANE TYPE
Filed July 6, 1961     10 Sheets-Sheet 5

INVENTOR.
KARL EICKMANN

BY

June 7, 1966  K. EICKMANN  3,254,489
COMBUSTION ENGINE OF THE ROTARY VANE TYPE
Filed July 6, 1961  10 Sheets-Sheet 6

INVENTOR.
KARL EICKMANN

June 7, 1966 K. EICKMANN 3,254,489
COMBUSTION ENGINE OF THE ROTARY VANE TYPE
Filed July 6, 1961 10 Sheets-Sheet 7

INVENTOR.
KARL EICKMANN
BY

June 7, 1966  K. EICKMANN  3,254,489
COMBUSTION ENGINE OF THE ROTARY VANE TYPE
Filed July 6, 1961  10 Sheets-Sheet 8

INVENTOR.
KARL EICKMANN
BY

June 7, 1966 K. EICKMANN 3,254,489
COMBUSTION ENGINE OF THE ROTARY VANE TYPE
Filed July 6, 1961 10 Sheets-Sheet 9
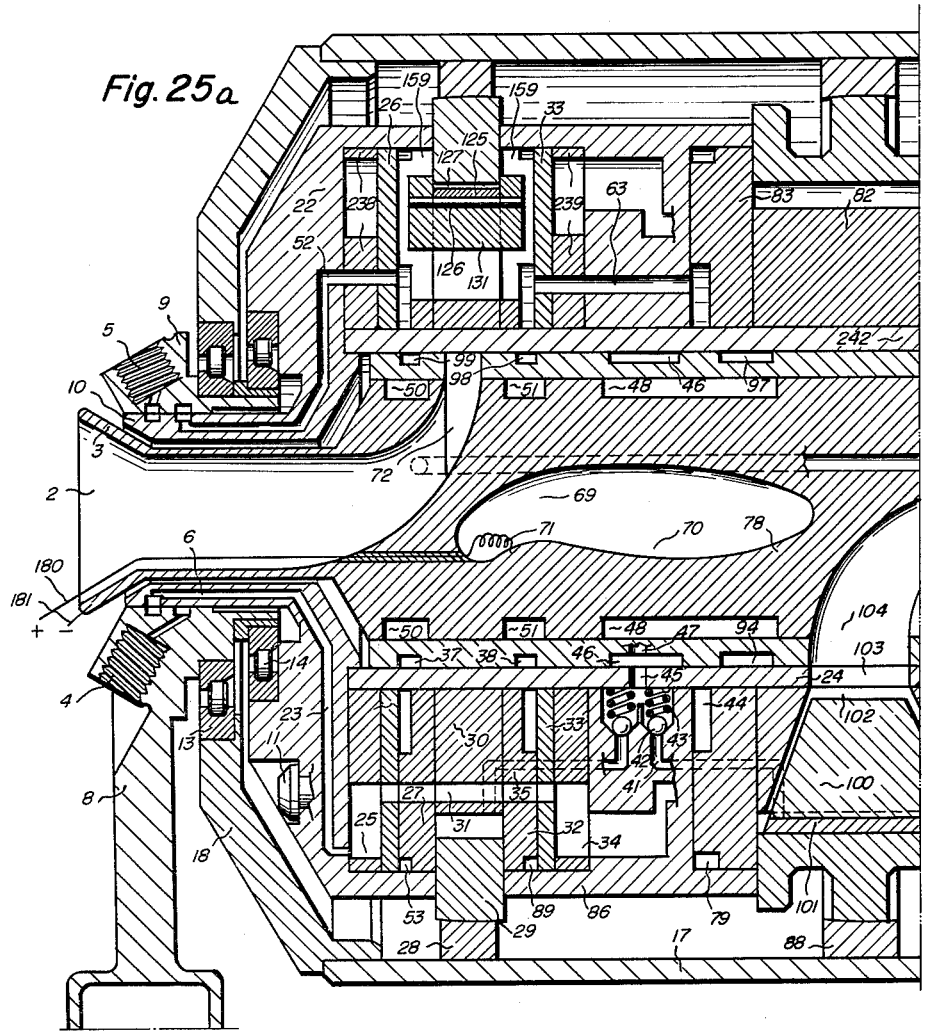
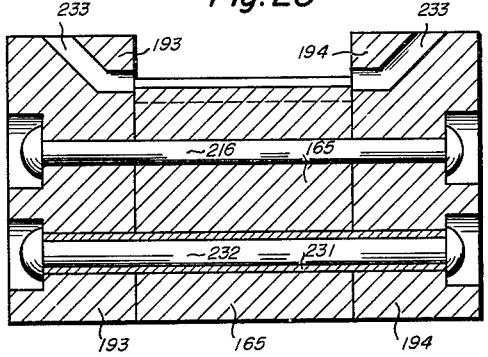
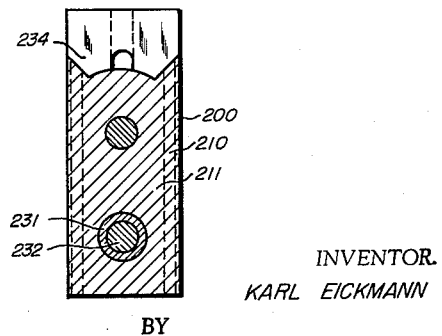
INVENTOR.
KARL EICKMANN June 7, 1966 K. EICKMANN 3,254,489
COMBUSTION ENGINE OF THE ROTARY VANE TYPE
Filed July 6, 1961 10 Sheets-Sheet 10
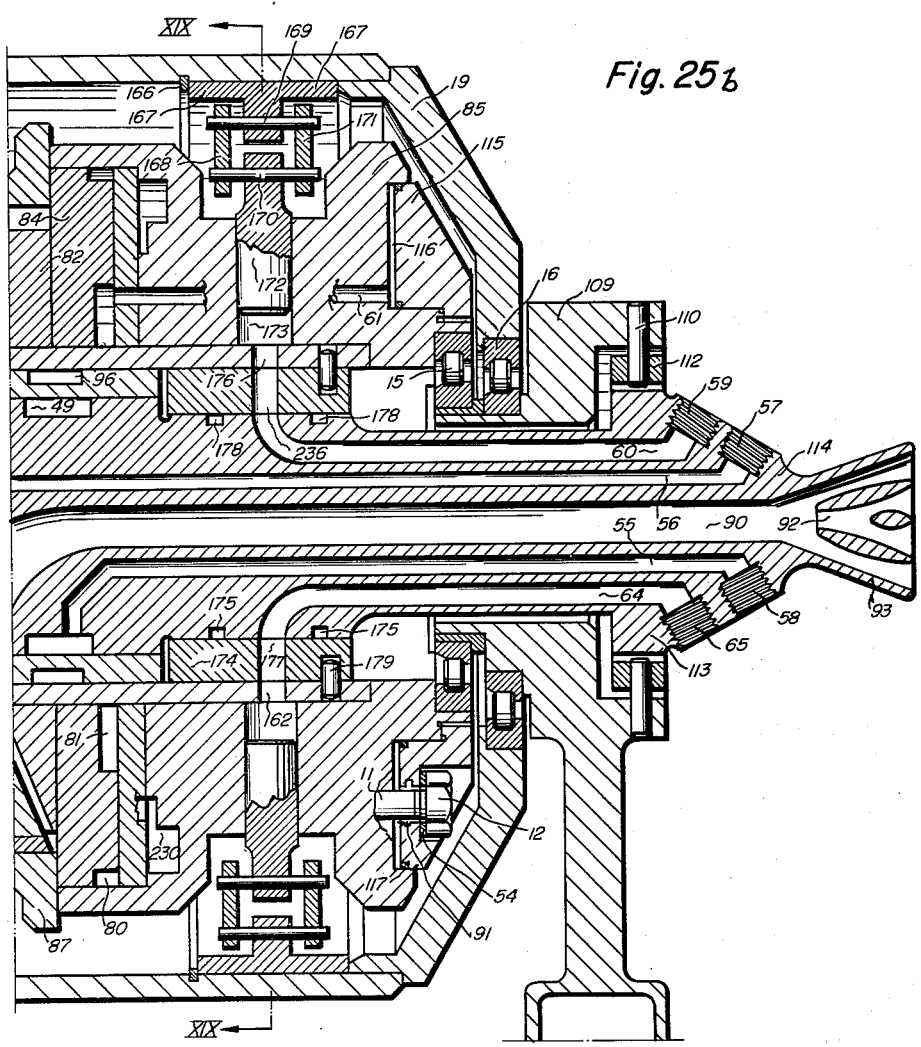
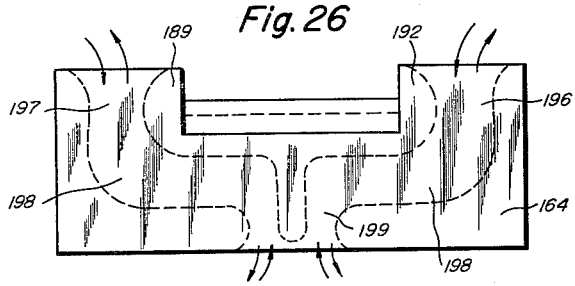
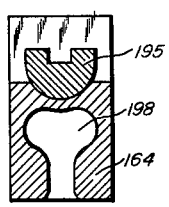
INVENTOR.
KARL EICKMANN

United States Patent Office 3,254,489
Patented June 7, 1966

3,254,489
COMBUSTION ENGINE OF THE ROTARY VANE TYPE
Karl Eickmann, 2420 Ishiki, Hayama-machi, Miuragun, Kanagawa-ken, Japan
Filed July 6, 1961, Ser. No. 123,384
Claims priority, application Switzerland, July 11, 1960, 7,923/60
19 Claims. (Cl. 60—39.61)

The present invention relates to an internal combustion engine of the rotary vane type which is capable of operating under high pressures and comprises one or more rotary compressors and/or power-producing elements or motor means, for example, in the form of rotary pistons, rotary vanes, or rotary trochoidal pistons.

It is an object of the present invention to provide a rotary vane type combustion engine in which the parts thereof which are movable relative to each other are sealed much more effectively than in previous engines of this type, so that in this respect the new engine will be at least equivalent to piston type combustion engines.

It is another object of the present invention to provide such an engine with improved lubricating and cooling means.

A further object of the invention which is of great importance is to provide a very stable mounting of the vanes within the rotor or in the side walls thereof. Another object of the invention is to design the engine so that the media will act upon the vanes in such a manner that they will be balanced as well as possible insofar as the forces acting thereon are concerned. The friction may thus be reduced and the tightness, efficiency, and durability of the engine will be increased.

It is a further object of the invention to reduce the relative speeds of the antifriction bearings carrying the parts which are movable relative to each other, and to reduce the diameter of the stationary parts which engage with the rotors.

A further object of the invention consists in improving the cooling effect to a still greater extent by providing an additional cooling system for reducing the maximum temperatures within the engine.

According to a further feature of the invention, the friction is further reduced by suspending the casing ring surrounding the work chambers like a pendulum so that it will follow any out-of-true errors of the rotors whereby any tilting and an increased friction thereof will be avoided.

Further objects of the invention are to attain a very compact arrangement of rotor units and control elements, and to provide very advantageous methods of combustion of the fuels required for the operation of the engine, as subsequently described in greater detail.

By means of the combustion engines according to the invention which deliver their power by means of currents of pressure media it is possible to combine the currents of pressure media of different engines in one conduit so that the hydraulic power output of the individual engines will be added to each other. It is possible in this manner to assemble a number of smaller engines into one battery of engines. This, in turn, permits the production of standard types of engines of an equal output in large series and then the assembly of a suitable number of such engines into one battery which is capable of delivering the required larger power output through a common conduit for the different pressure currents.

Another object is to prevent entirely the gas losses caused by leakage which were unavoidable in the former Otto and diesel engines of the piston-type construction. The invention further achieves a reduction of the losses in pressure oil.

The various objects, features, and advantages of the invention will become more clearly apparent from the following detailed description thereof which is to be read with reference to the accompanying drawings, in which—

FIGURES 1a and 1b are divided parts of a longitudinal section of a first embodiment of a combustion engine according to the invention;

FIGURE 4 shows a cross section taken along line IV—IV of FIGURE 1;

FIGURE 5 shows a cross section taken along line V—V of FIGURE 1;

FIGURE 6 shows a cross section taken along line VI—VI of FIGURE 1;

FIGURE 7 shows a cross section taken along line VII—VII of FIGURE 1;

FIGURES 25a and 25b are divided parts of a longitudinal section of a further modification of a rotary vane engine according to the invention;

FIGURE 26 shows a further modification of the vanes to be employed in the combustion engine according to the invention;

FIGURE 27 shows a cross section taken along line XXVII—XXVII of FIGURE 26;

FIGURE 28 shows a further modification of the vanes to be employed in the combustion engine according to the invention;

FIGURE 29 shows a cross section taken along line XXIX—XXIX of FIGURE 28;

Figure 2:
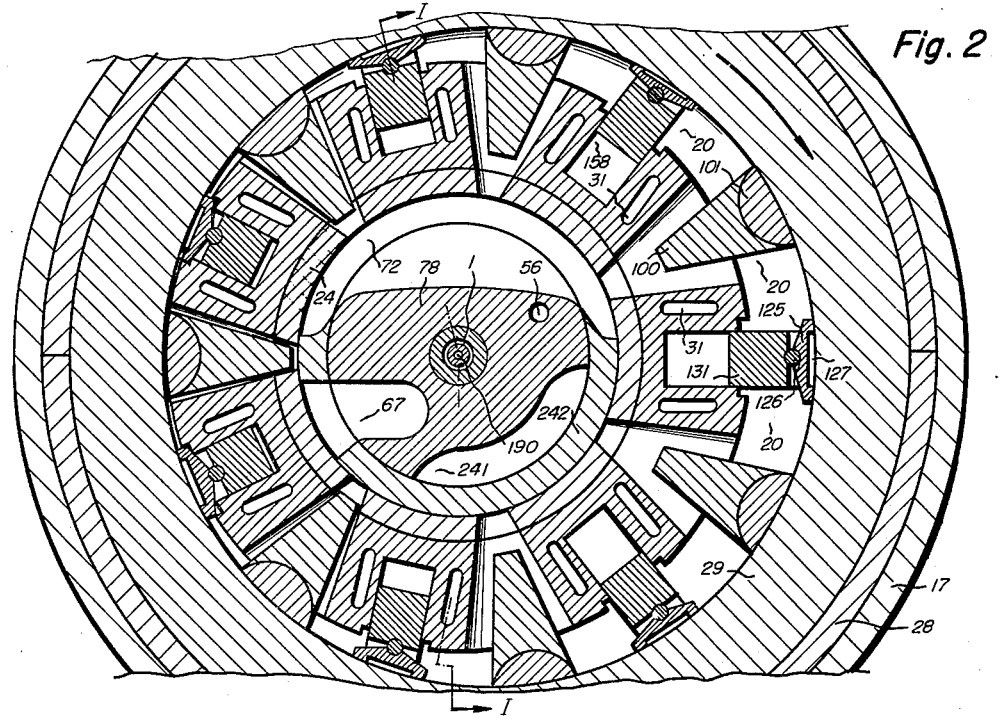
FIGURE 2 shows a cross section taken along line II—II of FIGURE 1.

Referring first to FIGURES 1 to 17 of the drawings, the engine according to this embodiment of the invention is mounted in a stationary position on feet or flanges 8 and 109 and the associated supporting and bearing elements on which the rotors are rotatably mounted by means of antifriction bearings 13, 14, 15, and 16. The engine comprises an inner group of rotors 30 and 82 which rotate centrally and are supported by lateral disks 22 and 85, while the rotor bushing 24 is supported by antifriction bearings 14 and 15, and it further comprises an outer group of rotors which is eccentrically disposed relative to the centrally rotating inner group and essentially consists of so-called casing rings 29 and 87 and the rotary outer housing ring 17 with lateral hubs 18 and 19, and which is supported by the antifriction bearings 13 and 16. The degree of eccentricity of one rotor group relative to the other may be adjusted to a constant value, as illustrated in FIGURES 1 to 8, or it may also be adjustable in a manner similarly as conventionally applied to rotors of controllable oil pumps with an adjustable capacity.

The central, radially inner rotors 30 and 82 contain the work chambers 20 of the compressor (FIGURES 1 and 2) and the work chambers 21 of motor means (FIGURES 1 and 3) which are located between rotors 30 or 82, respectively. These work chambers are divided by the vanes 131 with their guide runners 125 and are closed in radial directions by the radially outer rotors or their casing rings 29 and 87 which are eccentrically disposed to rotors 30 and 82. Rotors 30 and 29 form parts of the compressor or its rotor unit, while rotors 82 and 29 form parts of the motor means or its rotor unit. The compressor and the motor means are in effect separated by the combustion chamber 70 which is disposed within the stationary main shaft 78.

The main shaft 78, which is mounted on the frame formed by the feet or flanges 8 and 109 in a manner as subsequently described, supports—through a control bushing 73 and other bushings 242 which serve for conducting the sealing, lubricating, and cooling media—a rotor bushing 24 which is thus rotatably mounted and serves for connecting the lateral hubs 22 and 85 to which it is firmly secured by a tight fit or by means of clamping bolts 11. An outer rotary supporting ring 17, which is mounted on the bearings 13 and 16 in a position eccentrically to the main shaft 78 and serves for supporting the casing rings 29 and 87 in a manner as later described, encloses the rotor units like a housing.

Aside from the rotor 30 and the casing ring 29, the compressor comprises primarily the two lateral walls 27, 26, and 32, 33 which are individually divided and are supported in the axial direction by disks 238 and 239, and further the vanes 131 which are disposed in slots 158 of rotor 30 and are slidable by means of vane extensions 124 and 123 in slots 148 of the axially inward side wall disks 27 and 32, respectively. Slots 148 are closed in the axial direction by the outer side wall disks 26 and 33. The vane extensions 124 and 123 are further extended in a radially outward direction so as laterally to enclose and engage closely with the casing ring 29. The vanes are thus slidable along the cylindrical inner surface of casing ring 29 by means of guide runners 125 which are pivotably mounted on the vanes by pivot pins 126, as later described in detail. The vane extensions 124 and 123 further divide each of the slots 148 in the side wall disks 27 and 32 into a radially inner slot chamber which communicates radially within the respective vane with slot chamber 158 in the rotor, and into a radially outer slot chamber 159 which communicates with the inner slot chamber through the clearance in slots 148 at the axial ends of the vane extensions. The outer slot chamber 159 is closed in a radially outward direction by the housing-like cylindrical wall of the compressor side wall 22 which axially engages closely with the casing ring 29.

The motor means may be made of a similar design, except that in the embodiment as illustrated in FIGURE 1 the rotor side walls are not divided. As shown particularly in FIGURE 3, vanes 131 merely run in the slots 158 of rotor 82, and the rotor side walls 83 and 84 support rotor 82 and casing ring 87 laterally in the axial direction, thereby forming the work chambers 21 of the motor means. The side wall disks, in turn, are mounted in the lateral housinglike hubs 85 and 86, either with or without additional intermediate disks. The power produced in the motor means may be further transmitted in the particular manner as later described or in any other suitable manner.

The supply of fresh air occurs through the air intake channel 2 in the induction tube 3 of the main shaft 78. Through a control part 72 the fresh air enters into the rotor 30 of the compressor, as may be seen in FIGURES 1 and 2, as long as the work chambers 20 thereof increase in size during the rotation of the rotor. The air intake and compressor parts of rotor 30 are separated by webs of the main shaft. When chambers 20 of the compressor rotor 30 decrease in size, the air is compressed therein. The individual chambers are separated from each other by the vanes 131 and their pivotable guide runners 125. After the air has been compressed, it is forced through the rotor parts and the control part into the combustion chamber 70. The fuel or gasified fuel is fed, for example, by injection, into the combustion chamber 70 through the fuel line 1 and its nozzle 68, and it is mixed in the combustion chamber with the fresh air coming from the control port 67. If desired, a conventional carburetor may also be added in front of the intake line 2 so that a mixture of fuel and air will be fed to the compressor rotor. The combustible mixture which thus either passes into or is formed within the combustion chamber 70 may then be ignited therein by a suitable ignition device, for example, a spark plug or a glow plug filament 71 or any other conventional ignition means. After being ignited, the combustible mixture is burned within the combustion chamber 70. Depending upon the dimensions of the different parts and their position relative to each other, and also dependent upon the order of succession of the individual associated functions, the combustion may occur in the combustion chamber 70 either continuously or intermittently at a succession of ignitions. If desired, the combustion may also occur by self-ignition of the combustible mixture during the last part of the compression. The combustion process may occur entirely within the combustion chamber 70 or in addition it may also occur in the motor work chambers 21. Furthermore, depending upon the geometrical and timed relations, it may occur either according to the conventional constant-pressure method or according to the constant-volume method, or according to a combination of both methods.

Figure 3:
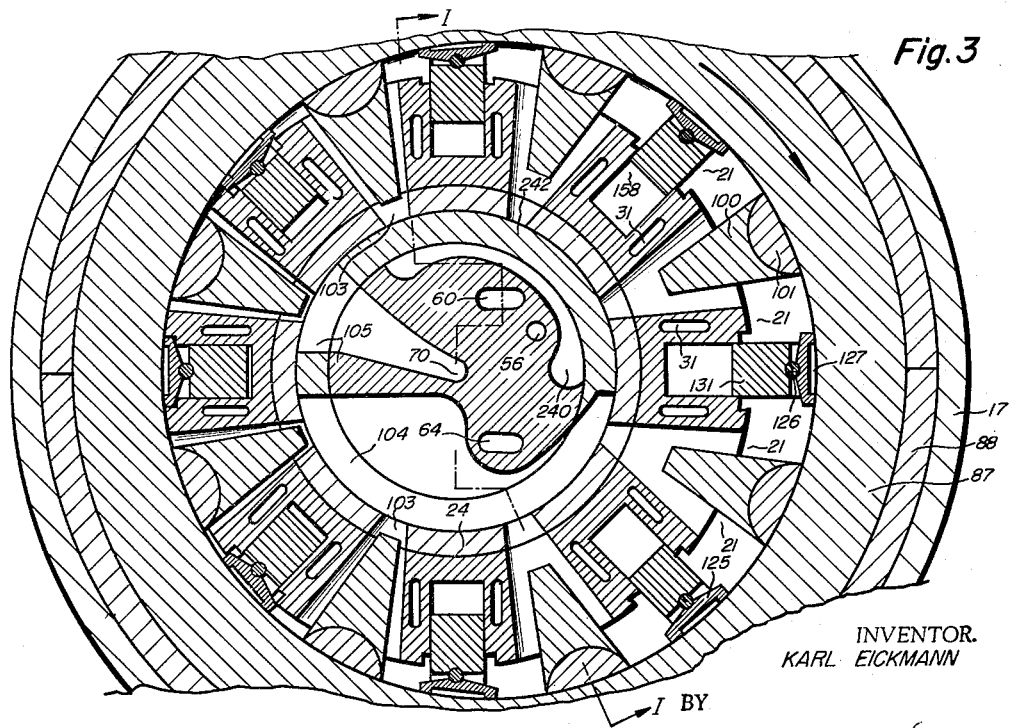
FIGURE 3 shows a cross section taken along line III—III of FIGURE 1.
Figure 8:
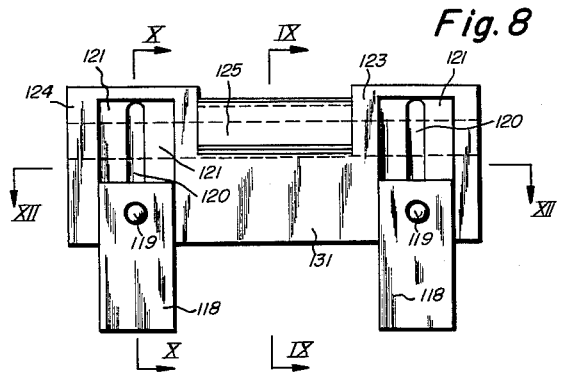
FIGURE 8 shows one embodiment of the vanes employed in the combustion engines according to the invention.

After the combustion, the combustion gases pass from the combustion chamber 70 through the control part 105, as shown in FIGURE 3, into the work chambers 21 of the motor rotor 82 and thereby rotate the latter. After being partly or entirely released, the combustion gases are discharged from rotor 82 through the control ports 103 and 104. The exhaust gases may then escape to the outside either directly or through an exhaust line 90 or an additional exhaust outlet 93 with inserts 92 in the end 114 of the main shaft 78.

As already mentioned, the motor rotor 82 is secured by bolts 11 and nuts 12 to the compressor rotor 30 and the associated side walls and intermediate parts 22, 26, 27, 32, 33, 86, 83, 84, 85, 238, and 115. When the motor rotor rotates, all of these rotor parts, side walls and intermediate parts which are connected by bolts and nuts 11 and 12 therefore rotate likewise. Of course, in place of these bolts and nuts, other connecting means may also be applied. In order to attain high rotary speeds and thus a high output per unit of weight, the rotor ports, for example, ports 102 of the motor, may be made of a relatively large cross-sectional size to permit the passage of large volumes of air or gases within a certain length of time. Depending upon the particular design of the rotors, this might result in the formation of relatively large dead spaces within the rotors which would limit the compression ratio. This disadvantage may be avoided by filling out the rotor channels with filler elements 100 which will be propelled outwardly by the centrifugal force and will thereby open the rotor ports accordingly. These filler elements 100 may be provided with pivotable runners 101 in order to adapt themselves to the change of the surface of the outer eccentric rotors or casing rings 29 or 87 without any substantial gaps. The filler elements may be made hollow and provided with narrow webs at the points where they engage with or slide along the respective casing ring. The surfaces of the filler elements which engage with the casing ring may also be provided with recesses so as to reduce the heat transmission. They may therefore be maintained at a high temperature so as to promote the ignition and combustion.

The engines according to the invention may be provided with a special cooling system, preferably by water. It is also possible to provide a cooling system which serves for the internal cooling of the combustion chamber by the injection of water or other coolants into the combustion chamber, for example, through the auxiliary injection line 190, so that a vaporization and mixing occurs at 191 behind the place of combustion and the temperature of the combustion chamber will thus be reduced, while the volume of the coolant, for example, the water, will be increased when vaporized from its liquid to its gaseous state.

In the embodiment of the invention as illustrated in FIGURES 1 to 17, a double liquid-cooling system is provided. The first system serves for cooling the rotating parts, especially the rotors and their side walls. The coolant then passes to the compressor rotor from a coolant line which is connected to the coolant intake connection 5 in the housing bushing 9 and then through the latter and through the coolant channel 23 which extends through the tubular flange 10 on the rotor side wall disk 22. It then flows through the cooling chamber 25 of the rotor and further through the cooling channels 31 into the next rotor cooling chamber 34. The compressor rotor is thus cooled at both sides. A similar cooling channel system may be provided for the motor means. Between the compressor and the motor means, that is, in the rotor side walls thereof and in the partitions between the rotors, further coolant channels and cooling chambers preferably of considerable sizes may be provided, as indicated, for example, by the coolant area 163. In addition to a cooling system similar to that of the compressor, a coolant collecting channel 230 is provided laterally of the releaser rotor. The coolant enters into this channel 230 after passing through the cooling system of the releaser and it will then be discharged from the engine through a coolant line 7 and 55 and the connection 58, or it may then be passed to a cooler. It is also possible to return the coolant from the collecting channel 230 through other special channels to the compressor and then to discharge it through another coolant return connection, not shown in FIGURE 1. If the cooling system for the rotor is operated with a liquid coolant, special provision has to be made to conduct the liquid from the stationary elements into the rotating elements. As illustrated in the drawings, this transfer occurs in the vicinity of the connection 5 and at the point 7, that is, at such parts of the engine where it is possible to make these transfer points of a small diameter so that any sealing means which might be provided will cause very small losses through friction.

For cooling the stationary main shaft 78 of the engine according to FIGURES 1 to 17, a special cooling system is provided. The coolant is supplied through the coolant connection 57 to shaft 78, where it passes through line 56 to the inside of shaft 78 and then, for example, through the channel 66 to the cooling areas 50 of the compressor. From these areas it may then flow through connecting channels to the cooling areas 51, thence through further connecting channels to the cooling areas 48 of the releaser, and then from one or several of the other cooling areas through further connecting channels to the cooling areas 49 from which it may flow through the coolant line 55, for example, to the coolant connection 58 where it may be discharged from the engine or be passed to a cooler. As shown in FIGURE 1, before reaching the coolant connection 58, the coolant for shaft 78 may combine with the return flow of the coolant coming from the rotor cooling system. Obviously, the particular path of travel of the coolant depends upon the particular design and construction of the engine and does not necessarily have to lead as illustrated in the drawings.

The rotary housing 17 and the outer rotors or casing rings 29 and 87, as well as the intermediate rings 28 and 88 on the casing rings may also be provided with a suitable cooling system. These elements do not, however, always require a liquid coolant but, depending upon the dimensions of the thermodynamic and geometric values of the engine, the cooling action of the outer air, assisted for example, by cooling ribs, may often be sufficient to cool the surface of the rotary housing ring 17.

If desired, a combination cooling system may also be provided, for example, in such a manner that, while the rotating housing 17, 18, and 19 is air-cooled, for example, by the use of cooling ribs, the areas between the housing and the rotor parts 86, 85, and 22 may be cooled by liquid coolants having a high heat-conductivity, for example, by emulsions or water. The rotors will thus be cooled very effectively. The cooling channels in the rotors may then also be connected with the large coolant chamber which is thus formed and which then conducts the heat from the inside to the outside. In this manner, the casing rings will also be cooled very effectively.

The pressures in the compression and motor chambers, especially if these pressures are very high and higher than the conventional pressures in combustion engines, may result in an enlargement of the axial length of the rotor bolts 11 which hold the rotor elements together. If such an elastic extension of the bolts occurs, the fit and play between the lateral parts of the rotors and casing rings is also enlarged. This would increase the leakage of sealing medium which, in turn, would result in a reduction of the efficiency of the engine. In order to avoid this, one end of the rotor parts, that is, according to this particular embodiment at a point adjacent to the releaser, is provided with a rotor balancing chamber 116 which is closed by a cover 115. Chamber 116 may be sealed by gaskets, particularly plastic gaskets 117. All of the rotor parts are held together by the mentioned bolts 11 and their nuts 12 and possible intermediate elements such as washers 54 or similar means such as, for example, spring washers and the like. Connecting lines 61 are provided for conducting the pressure medium from the areas of a high pressure within the engine into the balancing chamber 116. If this results in an extension of the bolts, especially at a higher pressure, and if cover 115 is then displaced axially away from the rotor, the pressure within the balancing chamber 116 results at the same time in a compression of the rotor parts and rotor side wall portions between the head of the bolt or bolts 11 and the cover 115. Any increase in the clearance between the casing rings and the side wall portions of the rotors is thus avoided. In low-pressure engines this additional measure may be omitted if the axial deformations of the bolts due to internal pressure are of no consequence. Bolts 11 may then be sealed by gaskets 91.

In all rotary machines out-of-true errors may always occur particularly if the bearings are not in a perfect condition or if there are slight inaccuracies in manufacture. In order to compensate such errors without causing any considerable increase in friction and a binding action between the rotor side walls and the casing rings, the casing rings are suspended like a pendulum and are therefore capable of following any out-of-true errors of the rotors. Thus, casing ring 87 is mounted by means of associated spherical surfaces within the divided intermediate ring 88 so as to be capable of rocking therein, while casing ring 29 is mounted in the same manner within the divided intermediate ring 28. The intermediate rings 28 and 88 may slide in the axial direction within the rotary housing ring 17 in order to be able to follow any axial displacements of the rotors.

In place of the pivotable suspension in two-part rings and within the rotary housing, it is also possible to mount the casing rings so as to be rotatable in spherical antifriction bearings. Such a method has, however, the disadvantage that the diameter of the casing rings relative to the rotor will be rather large so that the rotary speeds of the antifriction bearings will be high which would result in losses due to friction in these bearings. These frictional losses may be considerably reduced and the total efficiency of the engine may be considerably increased if the diameter of the antifriction bearings is reduced. For this reason, the antifriction bearings 13, 14, 15, and 16 which carry the rotors are preferably arranged at both sides of the rotor blocks with a small diameter. The flanges or side walls 18 and 19 are for this purpose inserted into the rotary ring 17, whereby not only the diameter of the antifriction bearings is reduced but the stability of the outer rotary rings 17 is increased. This outer ring 17 together with side walls 18 and 19 and the divided intermediate rings 28 and 88 and the casing rings 29 and 87 therefore rotate together, however, generally slightly eccentrically to the rotors which contain the vanes. By means of the mentioned arrangement it is possible to reduce the relative speeds between the vanes, the rotor side portions, and the casing rings. The eccentrically rotating parts, such as the casing rings, intermediate rings, side walls, and the outer housing ring are merely taken along by friction. However, means may also be provided, for example, gears with outer gear teeth on the central rotor and with inner gear teeth on the eccentric rotary part, or even a bolt within the central rotor which engages into a longitudinal slot in the radial direction within the eccentrically rotating part, so that the outer housing ring will be positively rotated. Such means are required especially if the outer ring 17 should serve as a driving element, for example, for driving a propeller, a belt pulley, a friction wheel, a gear, or the like.

Since rotating parts are easily subject to out-of-true errors because of errors in manufacture, errors in assembly, bearing errors, errors in mounting the bearings, or because of one-sided load, it is advisable also to arrange the control elements in such a manner that they will follow the out-of-true errors of the rotors. If this was not done, the out-of-true errors would lead to a considerable friction within narrow gaps or to tilting or even freezing between the relatively movable parts. The main control shaft 78 together with the parts belonging thereto is therefore preferably suspended, for example, on a flange part 113 within a Cardan ring 112 by means of the bolts. As shown in FIGURE 4, Cardan ring 112 may then pivot about the Cardan pins 110 and 111, and the Cardan ring is, in turn, suspended on bolts 110 in such a manner that it may also slide thereon. Bolts 110 are secured within the housing flange 109. The main control shaft 78 may therefore oscillate freely without being able to turn around its axis. Due to its slidable mounting within Cardan ring 112 and the associated Cardan pins 110 and 111, shaft 78 may follow all out-of-true errors of the rotors. Any tilting or high surface pressures between shaft 78 and the rotors or the rotor bushing 24 which is interposed between shaft 78 and the rotors are thus avoided, while at the same time shaft 78 is prevented from turning about its own axis. In order to avoid any one-sided pressure upon shaft 78, the shaft is preferably provided along its periphery with pressure-medium balancing areas. These balancing areas are acted upon by the pressure medium in order to counteract other pressures which may act upon this shaft.

Thus, for example, the balancing areas 98 and 99 of the compressor which are cut into the bushing 242 in the form of recesses will compensate the forces acting from the control port 67 upon shaft 78 when these areas 98 and 99 are acted upon by the pressure medium passing through the control port 67. The pressure-balancing areas 37 and 38 which, as shown in FIGURE 1, are disposed diametrically opposite to the balancing areas 98 and 99 also balance out the forces of the pressure medium acting from the control port 72 upon shaft 78 when they are filled with the medium from the control port 72 and are in communication therewith. In the position of the engine as illustrated in FIGURE 1, the control port 72 and the balancing areas 37 and 38 are filled with a sucked-up medium. Control port 67 and thus also the balancing areas 98 and 99 are, however, filled with a compressed medium.

The balancing conditions are similar on the periphery of the central shaft within the releaser. The control port 105, as shown in FIGURE 3, and also the balancing areas 94 and 95 are there acted upon by combustion gases and these areas balance out the control ports 105. The control port 104 and also the balancing areas 96 and 97 which communicate therewith are filled with exhaust gases in such a manner that the balancing areas 96 and 97 balance out the control port 104.

The control port 62 is filled with sucked-up pumping media, for example, hydraulic oil. It communicates with the pressure-balancing areas 76 and 77 so that the latter balance out the control port 62. The control port 40 of the compressor is filled with pumped pressure medium and communicates with the opposite pressure-balancing areas 74 and 75 which are likewise acted upon by the pressure-medium. The pressure-balancing areas 74 and 75 therefore balance out the control port 40.

By the interaction of the control ports and balancing areas at the periphery of the main control shaft 78 the latter is freed entirely or almost entirely from any one-sided medium loads and it therefore floats within the rotor bore without any one-sided loads.

By a hydrodynamic wedging effect by means of oil grooves it is also possible to center the shaft 78 within the rotor bore which, in turn, increases the sealing action, while the one-sided frictions due to weight etc. may be further decreased. In order to avoid any deformations and thermal stresses, balancing chambers 240, as shown in FIGURE 3, and 241 as shown in FIGURE 2 may be provided in the body of shaft 78 opposite to the ports and balancing areas for reducing thermal and pressure tensions. Shaft 78 has, for example, a cylindrical bushing 242 rigidly secured thereto which thus forms a part of the shaft. As illustrated in FIGURE 1, the chambers for the sealing medium are formed in the compressor rotor by the slot chambers 159 radially outside of the vanes in the rotor side walls and by the slotted chambers 158 in the rotors and the inner rotor side walls insofar as the latter are not filled out by the vanes, and further by the radial channels 148. The pressure medium filling these chambers 148, 158, and 159 may be, for example, a gas of a high viscosity or a pressure oil, for example, hydraulic oil. Thus, a central sealing chamber is formed around each individual vane.

The motor rotor of the embodiment according to FIGURE 1 differs from the compressor rotor by the fact that it has only one sealnig medium chamber which is formed within the motor rotor by the individual chambers of the balancing channels 79 and 80 in the releaser rotor side walls radially outside of the vanes, by the radial slots in the rotor side walls similar to the slots 148 of the compressor, further by the slot chambers 158 radially within the vanes insofar as they are not filled out by the vanes, by the annular channels 44 and 81 which are provided radially within the vanes in the rotor side portions or possibly also within the rotor, and by the slot chambers radially outside of the vanes similar to the slot chambers 159 of the compressor. The sealing medium chamber of the motor means together with the mentioned individual chambers 79, 80, 44, 81, and 148, 158, and 159 is likewise filled out with sealing medium, for example, with gases of a higher viscosity or with liquids, for example, hydraulic oil.

From the mentioned sealing medium chambers the pressure sealing medium flows around the vanes 131 of the compressor or motor laterally in the axial direction of the vanes and radially from the inside, and also the vane extensions in the rotor side walls radially from the outside and the guide runners also radially from the outside for the width of the rotor. This may be clearly seen from FIGURES 1, 2 and 3, as well as from FIGURES 8 to 17. From the sealing medium chambers of the compressor rotor or the motor rotor the pressure-sealing medium may enter directly into the balancing areas 127 of the vane guide runners so that the balancing areas will be fully acted upon by the pressure-sealing medium. Thus, the vanes are acted upon by the pressure-medium radially from the inside and from the outside, as well as in the axial direction from the sides.

Behind the compressor, for example, in line 36 or 161, valves, for example, check valves, may be installed within the conduit system of the pressure medium so that a return flow of the pressure medium into the compressor will be avoided.

The operation of the vanes is illustrated in FIGURES 8 to 17. The individual work chambers 20 and 21, as shown in FIGURES 2 and 3, are separated from each other by vanes 131. They may be provided either with or without pressure-balancing areas in the rotor side walls. In smaller engines with a lower output it is possible for reducing the costs to omit the arrangement of pressure-balancing areas in the vane portions which engage into the rotor side walls if the loss in efficiency which then occurs is taken into account or if the increased friction on vanes without such balancing areas has less effect upon the output than the leakage which occurs when such balancing areas are used. FIGURES 8 to 16 illustrate such vanes which are designed so as to have very little friction and are provided with balancing areas 121 and 130, and pressure-balancing areas in the vane extensions 123 and 124 which extend into the rotor side walls. In accordance with the invention, these vanes 131 are acted upon by entirely different media. From the side they are generally acted upon by pressure lubricant from the channels 148, shown in FIGURE 1. As illustrated by the pressure area cross sections 149 and 150 in FIGURES 11 and 12, this pressure lubricant acts from both sides in opposite directions upon the vanes 131. Since the pressures in both directions 149 and 150 are equally strong aside from any possible minor differences due to flow resistances, and since they thus practically neutralize each other, vane 131 is free of any resultant forces from channels 148 and therefore floats in a balanced condition between the sealing medium in channels 148.

The vanes are rotatably mounted within the compressor rotor 30 or within the motor rotor 82. Vanes 131 also engage, however, into the slots which are provided in the side walls, for example, 27 and 32, which are rotating with the rotors and they are likewise mounted within these side walls. Vanes 131 which are installed in the motor means are likewise mounted not only in the releaser rotor 82 but also in the rotor side walls 83 and 84 thereof. The axial extensions 123 and 124 of vanes 131 which engage into the rotor side walls 27, 32, 83, and 84 are also extended radially toward the outside, as seen relative to the rotor. These axial and radial extensions 123 and 124 of the vanes which hereafter are simply called vane extensions surround the casing ring 29 or 87 at the sides, as shown in FIGURE 1. They may also surround a housing part in a similar manner if the engine is provided with a stationary housing in place of the rotary casing ring 29 or 87.

Figure 10:
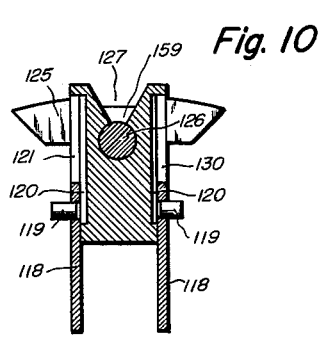
FIGURE 10 shows a cross section taken along line X—X of FIGURE 8.
Figure 9:
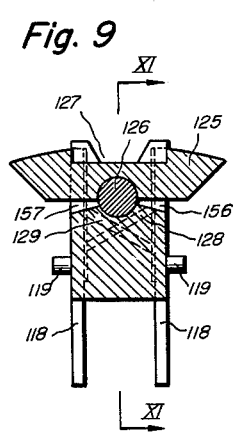
FIGURE 9 shows a cross section taken along line IX—IX of FIGURE 8.
Figure 14:
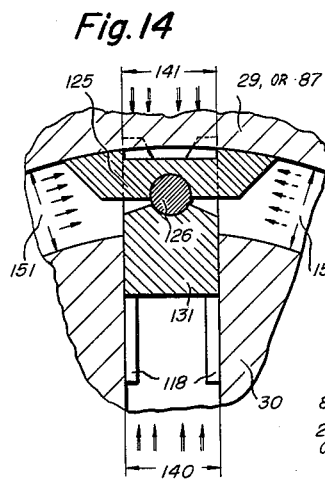
FIGURE 14 shows a part of the section taken along line III—III or line II—II of FIGURE 1 to illustrate the manner of installation of the vanes and their position between two work chambers.
Figure 16:
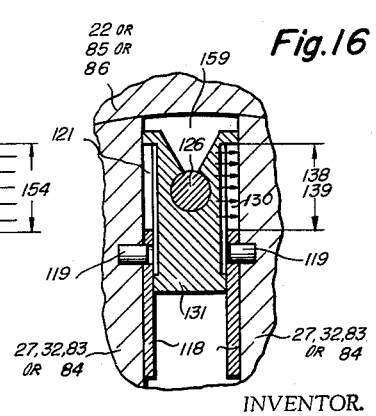
FIGURE 16 shows the same cross section as FIGURE 15, but only illustrates the action of working gas under pressure upon the rotor side wall.

The vane extensions 123 and 124 therefore serve for sealing the surfaces between the vane extensions and the casing ring 29 or 87. They serve, however, not merely for the purpose of surrounding the casing ring to seal this surrounding, but they also serve for mounting the wings on sufficiently large surfaces in the rotor side walls and also for mounting the vane guide runners 125 or the pivot pins 126 thereof. Each guide runner and pivot pin 125 and 126 may be made of a single piece of material, but they may also be made as shown of two parts, the actual guide runner 125, and a pivot pin 126 which may, for example, be cylindrical. The drawings show clearly how the pivot pins of the guide runners are mounted in the vane extensions 123 and 124 and also how the guide runner 125 and the pivot pin 126 are mounted. For the purpose of attaining an effective sealing action between surfaces of proper and sufficient dimensions rather than of lines or points it is advisable, as shown in FIGURES 10 and 16, to design the vane extensions 123 and 124 so as to surround the pivot pins 126 cylindrically by more than 180°. As shown in FIGURES 9 and 14, guide runners 125 should preferably also surround the pivot pins 126 cylindrically by more than 180°, that is, by more than one-half. This prevents the pivot pins 126 from falling out of the vane extensions 123 and 124 and the guide runners 125 from falling off the pivot pins thereof. This has also the advantage that the surfaces between the sides of guide runner 125 and the vane additions 123 and 124 will remain fully sealed even though the guide runner pivots for a certain extent, for example, for the extent which is due to the eccentric mounting of the casing ring 29 or 87 and to the sliding of guide runner 125 thereon. This effect is an important presumption for attaining the highly efficient sealing action. It becomes very evident by a study of FIGURES 8 and 9 in which it is clearly visible that the guide runner 125 is fitted between the vane extensions 123 and 124. Guide runner 125 may pivot about the axis of its pivot pin in order to be able to slide along the casing ring. However, since guide runner 125 and the vane extensions 123 and 124 surround the pivot pin 126 by more than the half (see FIGURE 9), the surfaces between the sides of the guide runner and the inner sides of the vane extensions remain sealed even though guide runner 126 is pivoted to a maximum extent, so that no connection exists between the slot chamber 159, as shown in FIGURE 10, and the pivoting areas 156 and 157, as indicated in FIGURE 9, but a continuous surface sealing exists between the mentioned areas.

Since the inner slot chambers 158 in the slots radially within the vanes are in communication by the channels 148 (or by means of cooling chambers 198 extending through the vanes) with the outer slot chambers 159 in the slots of the rotor side walls radially outside of the vanes (FIGURE 1), the vane extensions 123 and 124 are acted upon radially from the outside and radially from the inside by a medium (sealing medium) of a constant pressure (apart from small variations due to flow resistances). The forces from the pressure medium cross-sections 141, 142, and 144 (FIGURE 11) which act from the slot chambers upon the vanes 131 are directed opposite to the forces of the pressure medium sections 140, 145, and 147 and will therefore neutralize each other so that the vane extensions will float between them. The same medium which is in the channel 148 may also enter from the slot chamber 159 into the balancing area 127 of the guide runner. The forces acting from the balancing area 127 upon the guide runner are illustrated by the pressure medium section 143 in FIGURE 11 and balance the forces of the medium from the slot chamber 158 upon the vanes which are indicated by the pressure area section 146. The balancing area 127 is preferably made of such a size that the medium forces therefrom balance out partly or entirely the pressure medium sectional forces 146 and, if so desired, also the centrifugal force of the vanes, or that the maximum pressure within the engine will be limited when certain maximum pressures are being exceeded by the guide runner 125 being automatically lifted off the casing ring.

Figure 11:
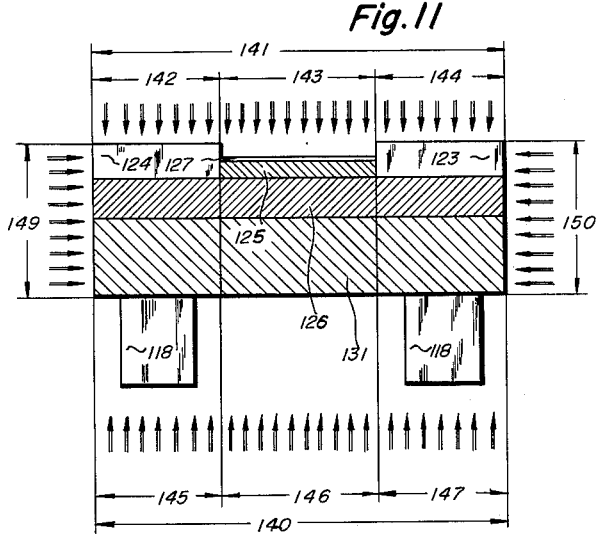
FIGURE 11 shows a graphical illustration of the distribution of forces acting upon a vane according to FIGURE 8, as seen in a cross section taken along line XI—XI of FIGURE 9.

If it is desired for sealing or heat-conduction reasons, guide runners 125 may also be made and installed without any balancing areas 127. For cooling the guide runner, the pivot pin 126 may, for example, be made hollow or tubular and be filled with a cooling or lubricating agent which may also be passed therethrough. If the various elements are all made of such dimensions that a pressure balance prevails, vane 131 will float laterally, radially outside and radially inside without any resultant medium forces between the pressure areas 141 (composed of 142, 143, and 144) and the pressure areas 140 (composed of 145, 146, 147) and the forces 149 and 150, as illustrated in FIGURE 11. The media which are then active mostly consists of sealing means, that is, highly viscous gases or liquids, especially oils. In order to indicate the higher viscosity of the medium more clearly, the media which become active from these areas are illustrated by double arrows. To distinguish herefrom, the pressure gases (working gases) are indicated by full-line arrows, while the other gases, that is, the fresh air, the mixture of fresh air and fuel, the exhaust gases, etc., are indicated by arrows with dot-and-dash lines (see FIGures 12 to 17). Vanes 131 are therefore acted upon by entirely different media, but at least by the sealing medium and by working gases and in addition in the vicinity of the intake ports by fresh air or a mixture of fresh air and fuel and in the vicinity of the exhaust outlet by exhaust gases.

Figure 17:
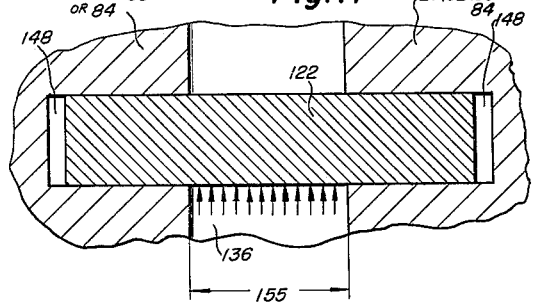
FIGURE 17 shows a cross section of one embodiment of a vane without balancing areas in the rotor side walls.
Figure 18A:
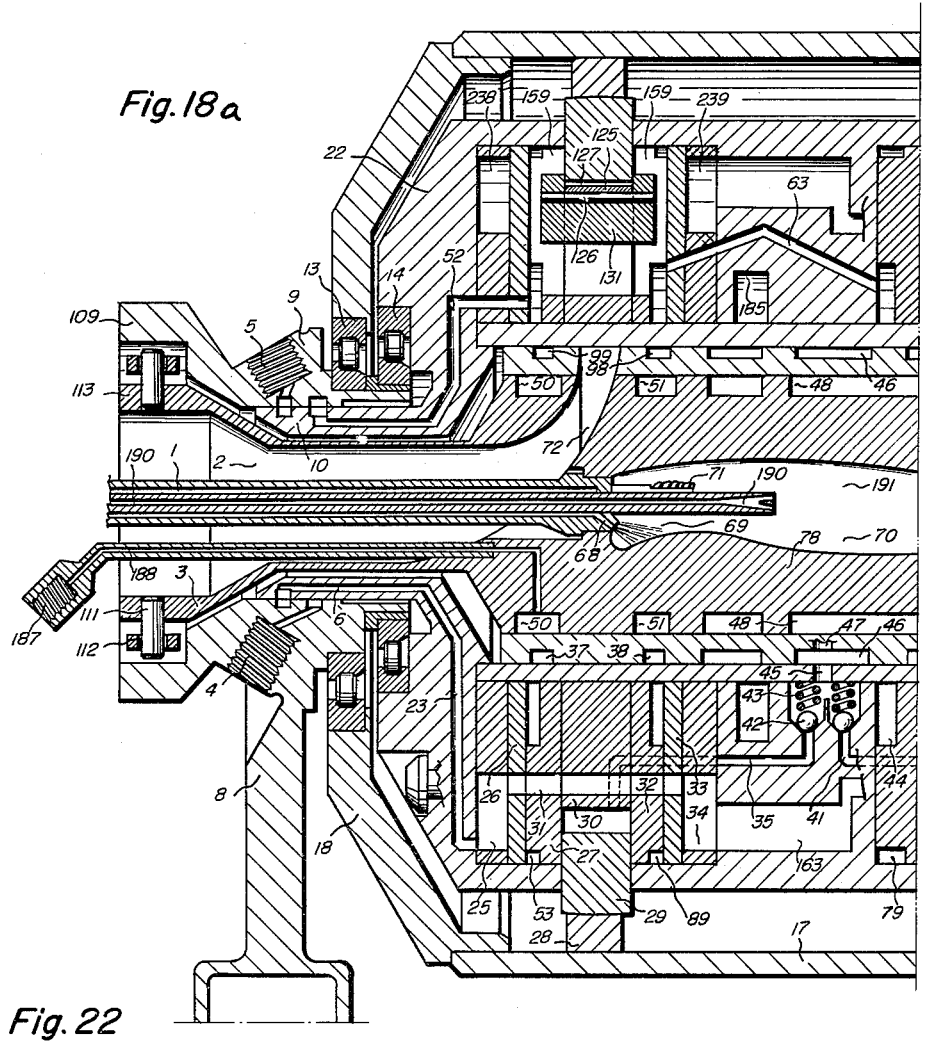
FIGURES 18a and 18b are divided parts of a longitudinal section of a rotary vane engine according to a modification of the invention.

FIGURE 17 illustrates how, for example, the working gas coming from the pressure zone area 155 with a width of the rotor acts by the forces 136 upon the vane 122. Vane 122 of FIGURE 17 is a simple vane without balancing areas in the vane extensions, that is, a vane as it may often be used in simple or smaller engines. It transmits the medium forces 136 purely mechanically to the rotor side walls 32 and 27 or 83 and 84 by being mounted on the slot wall.

Vane 131 in FIGURES 8 to 16, however, is provided with pressure medium balancing areas in the vane extensions 123 and 124 which balance out such medium forces partly or entirely by opposite or nearly opposite forces which act upon the vane in a tangential or nearly tangential direction.

Figure 12:
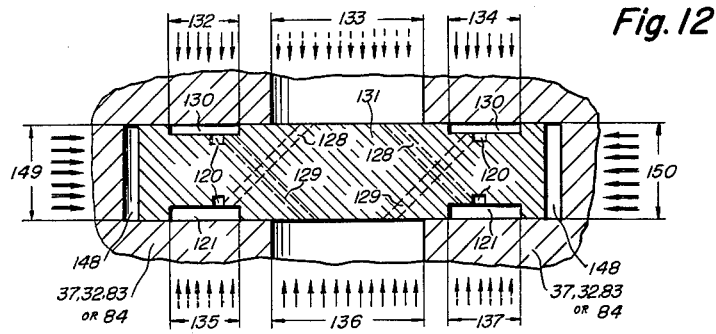
FIGURE 12 shows a similar graphical illustration of the distribution of forces acting upon a vane, as seen in a cross section taken along line XII—XII of FIGURE 8.
Figure 13:
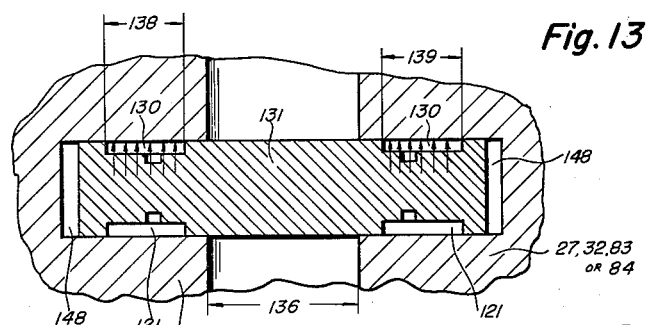
FIGURE 13 shows a cross section similar to FIGURE 12 to illustrate the balancing areas.

In FIGURE 12 the working gas which acts upon vane 131 in a tangential direction at rotor width is indicated at 136. This gas is conducted into the balancing areas 130 through the channels 129. The two balancing areas (recesses) of each vane are located diagonally opposite to the place of attack of the medium within the width of the rotor at the other vane surface in the two vane extensions 123 and 124. If properly designed, the balancing areas 130 as well as the opposite balancing areas 121 may be infinitely varied in cross sectional area parallel to the center line of the vane, as indicated in FIGURES 8 to 16. This infinite variation may be carried out in accordance with the variation of the size of the cross-sectional area of attack of the balancing medium on the vane, for example, in accordance with the working cycle of the engine. For this purpose of infinitely varying the cross-sectional size of the balancing area it is possible, as illustrated in FIGURES 8 to 16, to close the balancing areas 121 and 130, for example, in one direction by cover slides 118 which may tightly slide in the balancing areas 121 or 130 and are held in the side walls of the respective rotor, for example, by bolts 119. Channels 120 for the balancing medium may additionally serve to insure that the medium entering from channels 128 will spread out in the balancing areas 121 and 130 without any considerable losses in flow. Thus, while vane 131 slides radially into and out of the slots in the rotor side wall, the cover slides 118 will be firmly held by bolts 119 at a constant distance from the central axis of the rotor. In this manner it is possible to increase and decrease the size of balancing chambers 121 and 130.

Figure 15:
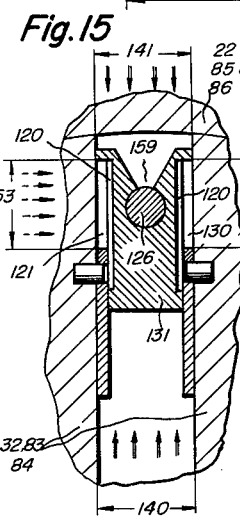
FIGURE 15 shows a partial cross section taken along line XV—XV of FIGURE 1 to illustrate the vane arrangement within the slots of the rotor side walls which are flanged to the rotor.

The working medium in the balancing areas 130 expands therein uniformly toward all sides. In the direction of the plane of the vane axis it hits upon the constant end walls of the balancing chamber, whereby the pressures balance each other on the vane. It also presses radially toward the outside upon the wall of the vane balancing chamber 130 and thereby increases the medium pressure upon the vane in a direction radially toward the outside. This force upon vane 131 may, if desired, be balanced out partly or entirely if the balancing area 127 is made of the proper size. Radially toward the inside, the medium presses from chambers 130 upon the cover slides 118 from which this force is transmitted to bolts 119 which can take up the mentioned force since they are mounted in the rotor side walls. Vertically to the plane of the central axis of the vane, the working medium expands in the balancing areas 130 likewise uniformly in both remaining directions and thereby also exerts equally large forces in these directions. In the direction toward the central plane of the vane, the working medium is thus used in the balancing chambers 130 to build up the balancing areas 132 and 134 which are also indicated in FIGURE 15 by the numeral 154. The sum of the forces from the areas 132 and 134 is of an equal size as and directed opposite to the action of the medium forces from 136 upon the vane 131. If the balancing areas are properly dimensioned, the forces 132, 134, and 136 acting upon the vane therefore neutralize each other. Vane 131 floats between them if the parts are properly and ideally designed without any resultant forces. In the remaining direction vertically to the central plane of the vane and pointing away from it, the force exerted upon the wall is of an equal size as the force exerted upon the vane from the opposite direction. The walls which close the balancing areas 130 in the mentioned direction are the slot walls in the rotor side walls 32 and 27 or 83 and 84. The fields of forces from the balancing fields 130 acting upon the rotor side walls 32 and 27 or 83 and 84 are illustrated by the pressure field sections 138 and 139 in FIGURES 13 and 16. After vane 131 itself floats without any resultant forces between the medium balancing fields, a resultant active force only remains at 138 and 139 which, however, no longer acts upon the vane but upon the slot walls in the rotor side walls. The forces of the pressure fields 138 and 139 will then, however, not act upon the rotor side walls. In engines or motors with a torque delivering shaft, the pressure of the fluid medium acting on these pressure surfaces produces the torque of the engine. In engines, such as pumps and compressors, in which the output is delivered in the form of a hydraulic pressure current, the pressure of the fluid medium acting on pressure fields such as 138 and 139 produces the torque for driving the rotors which, in turn, then produce, for example, a hydraulic pressure current by a pumping action.

Depending upon the position of vane 131 within the compressor rotor or within the motor rotor and depending upon the angle of rotation of the rotors, the pressure field section 133 opposite to the medium pressure field 136 (FIGURE 12) is likewise acted upon by working gas or in the compressor rotor by fresh air or a mixture of fresh air and fuel or in the motor rotor by exhaust gases.

The pressure of the medium at the pressure field section 133 which may, for example, be low is transmitted through the channels 128 into the balancing areas 121 and there acts accordingly as the medium in 130 acts upon the vanes 131, the balancing chamber walls, the cover slides, and the rotor sidewalls. The forces of the medium from the pressure field 133 and the forces of the balancing medium facing in the opposite direction are indicated in FIGURE 12 by dotted-line arrows. FIGURE 12 also shows how the medium forces from the pressure field section 133 are balanced out by the balancing fields 135 and 137.

In FIGURE 14, the radial pressure field section of the pressure field 136 is indicated at 151; in FIGURE 15 the radial pressure zone section of the balancing fields 132 or 134 is indicated at 154; in FIGURE 14 the radial section of the pressure field 133 is indicated at 152; and in FIGURE 15 the radial section of the balancing fields 135 or 137 is indicated at 153. FIGURES 14 and 15 illustrate how the balancing fields and the medium fields are directed substantially opposite to each other and how they are preferably designed so as also to have equal cross sections in the radial direction.

FIGURE 14 illustrates how the working medium of the pressure field section 136 (151) is embedded between the casing ring 29 or 87 and the rotor 30 or 82 and how it is directed upon the vane 131, the vane pin 126, and the guide runner 125. The action of the pressure field section 133 (152) upon the mentioned parts and between the mentioned parts is also indicated in FIGURE 14.

FIGURE 15 clearly illustrates the position of the slot chamber 159 radially outside of vane 131 and enclosed within the rotor side walls.

FIGURE 15 also shows clearly the position of the balancing fields 121 and 130 between the rotor side walls 27 and 32 or 83 and 84, the vane 131, and the radial closure of the fields by vane 131 and the cover slides 118.

Figure 31:
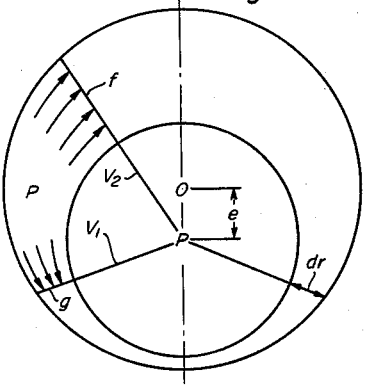
FIGURE 31 is a diagram representing the forces exerted by a fluid medium on the vanes.

FIG. 31 is a schematic cross section along line II in FIG. 4. Point P indicates the axis of the rotor, and point O indicates the center of the casing ring, the two points being spaced a distance $e$ representing the eccentricity. The outer circle indicates the inner face of the casing ring, and the inner circle indicates the outer surface of the rotor center part. The pressure in the working chambers $p$ acts not only on one vane, but at two vanes $V_1$ and $V_2$. Since vane parts of different length are located in the working chamber in contact with the pressure medium due to the eccentricity of the rotor and casing ring, different areas $g$ and $f$ are subjected to the pressure $p$ which can be considered to be the same in the entire working chamber formed between the vanes $V_1$ and $V_2$, and between the outer surface of the rotor and the inner surface of the casing ring. The produced torque is equal to the difference between the torques acting on the two adjacent vanes so that the rotor will be driven in clockwise direction in FIG. 31. The entire torque of the engine can be calculated by adding the torques acting on the vanes in one direction of rotation, and subtracting the torques acting on the vanes in the opposite direction of rotation.

At high temperatures within the engine it may be of advantage to cool the vanes and thus also to limit the thermal deformations of the vanes.

One preferred embodiment of this is illustrated in FIGURES 26 and 27. The axial ends of the vane extensions 189 and 192 of vanes 164 may be fitted relatively tightly between the lateral walls so that the volume of the flow through the channels 148 will be limited. At the radial movement of vane 164 with guide runner 195 the sealing medium in the slot chambers 158 and 159 will be forced in accordance with the vane movement to flow through the coolant inlets 196 and 197 and through the cooling chamber 198, as well as through the coolant outlet 199. At such a flow the medium will cool the vane 164 effectively from the inside and will thus limit its maximum temperature and its thermal deformations.

The rotors according to the invention (compressor rotors and motor rotors) may also be equipped with vanes of a design as shown in FIGURES 28 and 29.

Such vanes may be used for the reason of reducing their cost and simplifying the manufacture, but also for cooling reasons. According to the embodiment as shown in FIGURES 28 and 29, vane 165 has vane extensions 193 and 194. The vane and vane extensions may consist of a single piece of material or they may be assembled of several separate parts. They may contain a heat-conductive core 211 of a material of a good heat conductivity, for example, heavy metal or light metal, which is capable of conducting away the heat concentration from the surfaces of the vane. The heat-conductive core 211 may be covered with an intermediate layer 210 or an outer layer 200 or both. The intermediate layer 210 may serve for connecting the layers 200 and 210 or for building up another heat-conductive or insulating layer between them. The layers 200 and 210 may be secured mechanically to the heat-conductive core 211 or they may be applied by galvanizing, spraying, or welding.

A production of vane 165 and the vane extensions 193 and 194 of different parts facilitates the formation of sharp edges between vanes 165 and the radial extensions of the vane extensions 193 and 194 which is absolutely necessary for a good sealing action. A geometrically exact production of such edges free of any fault would be very difficult or even impossible if vanes 165 and their extensions 193 and 194 were made of one piece. The individual parts 165, 193, and 194 of the vane may be held together by bolts or rivets 216. They may, however, also be connected by bushings 231 or by bushings and additional bolts or rivets 232.

The vane extensions 193 or 194 or both may or may not be provided with balancing channels 233. Also, vane 165 may or may not be provided with balancing fields 234. Such kind of vanes—without guide runners—affect the sealing action between the different work chambers by linear engagement with the casing ring or the inner surface thereof, that is, not in the manner as is done by the guide runners 125 in FIGURE 9.

At the transfer from the pressure side to the suction or exhaust gas side and vice versa a transfer occurs between the vane and casing ring from one sealing line to both lines and then to the other sealing line of vane 165.

As the result hereof, the balancing field 234 communicates once at each rotation with the oppositely operating rotor ports. The pressure medium which is enclosed within the balancing field 234 is thereby lost without being transformed into effective work.

The balancing field 234 should therefore preferably be made of a flat design in order to make the dead space which is produced by this balancing field as small as possible.

If a vane 165 is installed in a rotor with sealing medium chambers similarly in principle as that of the compressor rotor shown in FIGURE 1, vane 165 may be provided with balancing medium channels such as shown at 233. If, however, a vane 165 is installed in rotors with sealing medium chambers of the type as shown in the motor rotor in FIGURE 1, it should not be provided with any balancing medium channels 233 since these channels would otherwise produce a pressure balance from the balancing channels 79 and 80 in work chambers of a lower pressure.

In place of the vanes according to the embodiment 131, 164, or 165, it is also possible to employ vanes of such a design that the vane and vane extensions form a single flat plate. This design has, however, the disadvantage that the sealing action in the edges is difficult and that in the course of operation for a longer time it usually loses in efficiency.

If desired, the vanes according to FIGURES 8 to 17 may also be made without any balancing fields 121 and 130.

Whereas the sealing of the individual places by mechanical sealing elements would require a considerable amount of work and, because of the many parts concerned, would involve the danger of an insecure operation, the sealing medium chamber or chambers in the rotor side walls permit a central lubrication of all sealing points within the rotor by the adjustment of the required pressure without any mechanical aid.

The sealing medium is forced under pressure from the sealing medium chambers in the rotor side walls into the sealing gaps so as to fill out the latter. If desired, it may also flow slowly through them and thereby prevent the entry of any working gases of a lower viscosity, air, and exhaust gases into the sealing gaps. Thus, for example, the sealing medium from the annular channels 44, 81, 79, and 80 of the motor means (FIGURE 1) penetrates into the gaps between the casing ring 87 and the rotor side walls 83 and 84, as well as between the casing ring 87 and the rotor side walls 85 and 86 and seals them in the described manner. It also penetrates between vanes 131, the guide runner pins 126, and the guide runners 125, as well as between guide runners 126 and the vane extensions 123 and 124, and between vanes 131 and rotor 82, as well as between vanes 131 and the rotor side walls 83 and 84, and it seals the mentioned parts by penetrating into the sealing gaps between them.

The gaps between the stationary main control shaft 78 and the rotor bushing 24 or the rotor bore may also be sealed by sealing media (lubricating oil or the like) if it is passed under pressure from the control ports or pressure-balancing fields or areas 40, 76, 77, 62, 74, and 75 or further additional chambers on the periphery of the central shaft or within the shaft into the gap between the shaft and the rotating rotor bore or the rotor bushing 24.

If the supply of sealing media from the sealing medium chambers in the rotor side walls through the sealing gaps into the rotor work chambers would temporarily or continuously be excessive, the sealing medium would accumulate within the work chambers. A small amount of such sealing medium within the work chambers is at all times desired especially for sealing the casing ring. It is then thrown outwardly by centrifugal force and penetrates into the sealing gap around the casing rings. However, if too much sealing medium is contained in the chambers, it may flow at the time of the smallest chamber volume through the lines 35 or 41 to the sealing medium release valves 42 (FIGURE 1, center) and may open the latter under pressure. As soon as the excessive sealing medium has escaped in this manner, the release valves 42 will again close and the lubricant may then escape through the channels 45 into the collecting channel 46 of the main shaft where it may combine with the lubricant of the sealing chambers of the shaft or escape through special lines, for example, through the discharge line 47 in the main shaft. The relief valves for the sealing medium may be provided with additional valve springs 43.

In the engine according to the invention, the centrifugal force results in the rotor ports in an additional suction which produces an underpressure in the control port 72 which is added to the regular expansion suction. The inflowing air or mixture of air and fuel therefore only has to overcome within the intake channel 2 its own internal friction and the friction on the wall of the intake channel, that is, very small resistances. The losses which occur by the change in direction of the intake current from the intake channel 2 into the control port 72 are largely compensated by the centrifugal force which depends upon the speed of the rotor.

The various fluids progress through the engine along the following paths.

Fresh air enters at 2 into the engine as shown on the left of FIG. 1, and passes into the compressor rotor at 72, as shown in FIGS. 1 and 2. Compression takes place in working chamber 20 whereupon the compressed air enters at 67 into the combustion chamber 70 where the air and fuel mixture is ignited at 70 so that the burning gases enter at 105 into working chambers 21, as shown in FIG. 3. Expansion then takes place in working chambers 21 whereupon the exhaust gases enter at 103 and 104 into the discharge channel 90.

One part of the cooling medium enters at 5, as shown in FIG. 1, passes through channel 23, chamber 25, channels 31 in the rotor, see FIGS. 1 and 2, chamber 34, channel 163, chamber 230, and at 7 into the control shaft and channel 55 to be discharged at 58 as shown on the right side of FIG. 1.

The other part of the cooling medium enters at 57, on the right side of FIG. 1, passes through channel 56, branch channel 66 through ducts, not shown, to the cooling grooves 50, 51, 48, 49 which are connected to each other and channel 55 to the discharge duct at 58 shown on the right side of FIG. 1.

Oil for lubrication and operation is admitted at 59, see right side of FIG. 1, passes into channel 60, and at 62, 161 into the rotor channel 36, enters slot chambers 158, see FIG. 2, 148, 159 of the compressor, and returns in the same way to the slot chambers of the releasor, and also through channels 40–64 to opening 65.

The oil system includes also annular spaces 74, 75, 76, 77 on both sides of the control opening 62, 40, the annular space 46 with ducts 47, and ducts 35, 41 which are connected through valves 42 to the working chambers of the compressor and the releasor. Annular spaces 44, 49, 80, and 81 and duct 61 with balancing chamber 61 are also filled with oil in a manner not illustrated in the drawing.

Balancing chambers 37, 38, 98 and 99 of the compressor are filled with the pressure medium under the alternate control of control means 67, 72, as shown in FIG. 2. Balancing chambers 94, 95, 96, 97 of the releasor are alternately controlled by control means 104, 105 to be filled with the pressure medium, as shown in FIG. 3. Balancing chambers 121, 130, and also 127 provided at the vanes are also connected to the pressure medium.

The drive of the machine is effected by the releasor or motor, more particularly by rotor 82 which is driven by combustion gases and drives rotor 30 of the compressor. The vanes of the compressor are balanced as shown in FIG. 12. When the rotor of the releasor is driven by pressure acting on the vanes, a pressure difference is required between the forces acting on adjacent vanes so that a force results producing a torque acting in one direction of rotation.

Figure 20:
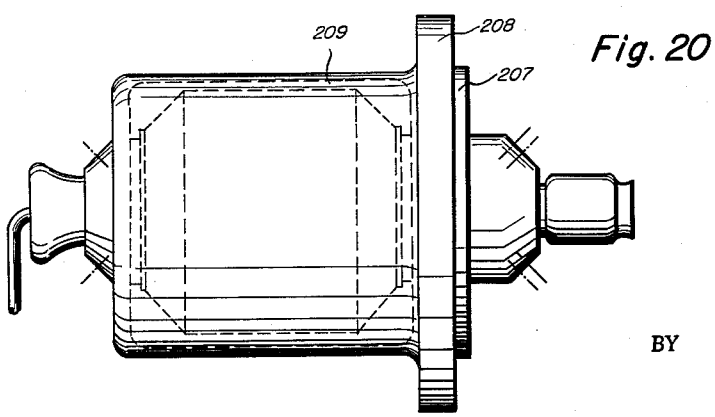
FIGURE 20 shows a modification of the housing of the combustion engine according to the invention.

FIGURE 20 indicates how the rotating parts of the engine may also be enclosed within a stationary housing. In the particular embodiment as indicated, housing 209 completely encloses the rotating elements, although it may also be modified so as to enclose them only partly. Housing 209 is provided with a flange 208 and a centering projection 207 on the flange in order to permit the engine to be very simply connected to a machine or to other engines. Housing 209 may, however, also be mounted in any other suitable manner, for example, on a base or on feet.

Figure 30:
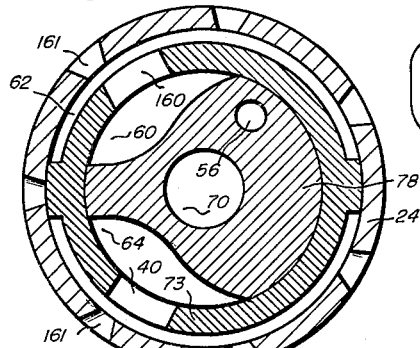
FIGURE 30, shows a cross section taken along line XXX—XXX of FIGURE 1.

Another manner of using the output of the engine will now be described with reference to FIGURES 1 and 30. The control bushing 73 for the supply of hydraulic medium is fitted tightly into the rotor bushing 24. Bushing 73 is, in turn, closely fitted on the body of the central shaft but so as to be slidable and rotatable thereon. According to the embodiment as shown in FIGURE 1, control bushing 73 is provided on a part of its inner surface with a gear rim which may be driven by a control 107 through a gear 39 on this shaft either directly or through a further intermediate gear 235. Control shaft 107 may be provided with a control hand lever 108 or with a connecting eye for connecting it to other machine elements. If the hand lever 108 is turned, the rotation of control shaft 107 and gears 39 and 235 result in a rotation of the control bushing 73 about its axis. The control lever 108, shaft 107, and gears 39 and 235 are illustrated only as an example of the control arrangement and they may be replaced by other conventional mechanical, hydraulic, or electric driving means. The result of the rotation of control bushing 73 is illustrated in FIGURE 30 when viewed in connection with FIGURE 1. A suitable medium, for example, hydraulic oil, is inducted through the intake line 60 and then enters through the channel 160 in control bushing 73 into the control port 62 thereof. Due to the suction effect in the slots underneath the vanes in the rotor, and due to the enlargement of the chambers in the slots radially underneath the vanes when the vanes slide radially toward the outside within the slots, the induced medium enters through the port 161 in the rotor bushing into the slot chambers 158 radially underneath the vanes within the rotor. This may occur for approximately one half revolution of the rotor. During the other half revolution of the rotor the chambers in the slots radially underneath the vanes decrease in size and force the medium which has been sucked up during the first half rotor revolution through the bushing port 161 and into the control port 40 of control bushing 73. The pumped pressure medium then passes into the pressure line 64 from which it may be discharged through the connection 65.

If the control webs and the control ports 40 and 62 are in their maximum position, the pump unit will suck during approximately one half revolution. If the control bushing 73 is then turned about its axis, the pump will suck radially underneath the vanes in the slots only during a part of the half revolution. If bushing 73 would be turned 90° a suction would be produced in the intake line 60 during one quarter revolution and a pressure effect during the other quarter revolution. The result would be that no suction would occur through the intake line 60 and there would also not be any supply of pressure medium through the pressure line 64. The pumped volume would therefore be zero.

By the rotation of control bushing 73 up to 90° it is therefore possible to control the rate of feed of the pump of the engine infinitely between zero and a maximum. When the engine is started, the pumped volume may therefore be reduced to a small output.

The rotation of bushing 73 about its axis may also be limited or it may be secured so that a minimum feed per rotor revolution will be attained at all times. This minimum feed may, for example, be of such a size that the amount of pressure medium supplied is just sufficient to ensure a sufficient supply into the sealing gaps for sealing the chambers.

Figure 18:
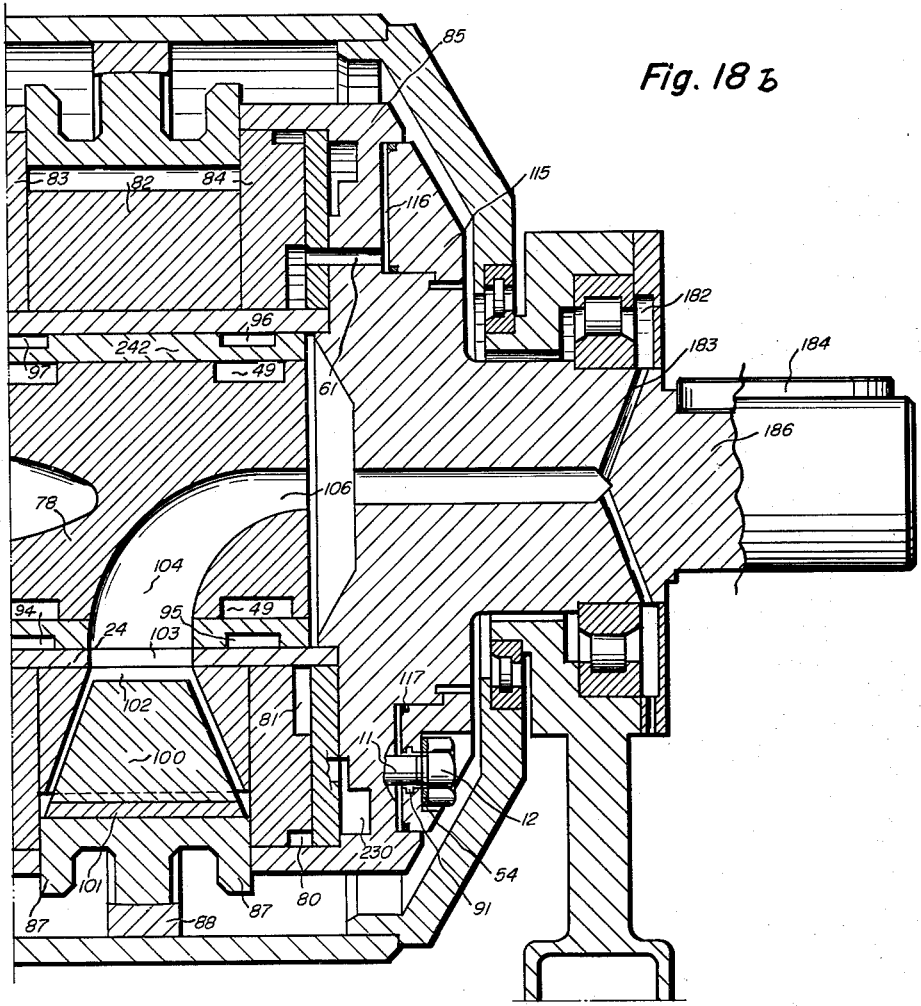

In the second embodiment of the engine according to the invention as illustrated in FIGURE 18 as well as in the third embodiment according to FIGURE 25 all of the parts which are indicated by the same reference numerals as in FIGURE 1 also carry out the same functions as in FIGURE 1.

In the embodiment according to FIGURE 18, the power delivery does not occur by means of a current of hydraulic pressure medium but by means of a rotating shaft. The lateral hub 85 of this embodiment is made of one piece of material with the driven shaft 186, although these two parts may also be made separately and be connected to the rotors by bolts.

The torque of the rotors of the engine according to FIGURE 18 is transmitted to the driven shaft 186 in such a manner that the lateral hub 85 which forms a part of shaft 186 is rigidly secured to the rotors by bolts 11. The torque which is produced in the motor means is therefore partly utilized for driving the compressor, and the excess is transmitted to the driven shaft 186 from which the output of the engine may be delivered for any desired purpose. The lateral hub 85 or the driven shaft 186 may again contain a rotor balancing chamber 116 into which the pressure medium is inserted through the connecting line 61. The driven shaft 186 may be provided with splines 184 in a conventional manner. It may also contain one or more exhaust gas lines 183 through which the exhaust gases may escape. The exhaust gases may collect in a channel 182 and be passed from there toward the outside or to any other desired point. The exhaust channels 183 may be reached by the exhaust gas from the control port 104 through the exhaust channel 106.

Since the engine according to FIGURE 18 is not provided with any hydraulic pump, the compressor rotor may be equipped with a sealing medium system similar to that as provided in the motor means according to FIGURE 1. The compressor rotor is then provided with balancing channels 53 and 89 which operate in the same manner as the balancing channels 79 and 80 in the motor means. The compressor rotor may then also be provided radially inside of the vanes with compensating channels (annular channels), and the chamber system for the sealing medium of the compressor rotor may be connected by the connecting line 63 with the chamber system for the sealing medium of the motor means so as to communicate therewith.

For reducing the rotating masses or for filling out the same with cooling media or lubricants, further chambers 185 may be provided in the lateral hubs of the rotors or in the intermediate walls.

The main control shaft 78 of this embodiment may be supplied with a coolant from the coolant connection 187 through the coolant line 188 into the coolant chambers 50, 51, etc. of the shaft. It may also be provided with a feed line, not shown, for a sealing medium or lubricant through which the sealing medium or lubricant is conducted into the sealing medium chambers of the shaft 78, for example, into the collecting channel 46 for the sealing medium, as shown in the middle of FIGURE 18. The feed lines may be similar to the feed lines 187 and 188, but instead of being connected to coolant chambers, they must be connected to sealing medium chambers. In order to adapt the main shaft to out-of-true errors it may also be suspended within a Cardan ring 112 which is connected to shaft 78 by means of Cardan joint pins 111 which engage into flange 113 of the main shaft.

The sealing medium may according to FIGURE 18 be supplied to the rotors through the connection 4 and the channel 52. The pressure within the sealing medium system may be adjusted outside of the engine, for example, by suitable pressure control valves.

The coolant for the rotors is supplied through the coolant connection 5 and the coolant line 6 into the cooling chamber 25. The coolant may be discharged through suitable channels which are not shown in FIGURE 18 since they lie within planes different from the plane of this drawing. The joints for the passage of the cooling and sealing media may be sealed by bearings between the housing bearing 9 and the rotor flange 10 with intermediate control ports which are shown but are not specially numbered.

The embodiment of the invention as illustrated in FIGURE 25 will be preferred especially if a hydraulic pressure current or pressure currents are required with a pressure which far exceeds the working pressure in the rotors. As illustrated, for example, in FIGURE 25, one or more pump units are then provided in the side walls of the rotor or of the motor means.

As shown in FIGURE 25, a radial piston pump unit is provided in the lateral hub 85 of the motor rotor. The pump cylinders 173 operate in a manner which is conventional in hydraulic radial piston pumps. The pump pistons 172 are mounted, for example, by bearing pins 170 in connecting webs 168 and 171 which, in turn, are mounted by bearing pins 169 in the bearing ring or bushing 167. This bushing 167 is prevented from shifting in the axial direction by a locking ring 166 and it is mounted within the rotary housing ring 17 or in the side walls 18 or 19 thereof. Due to the eccentric position of the rotary housing ring 17, an oscillating movement of the pump pistons 172 is produced during the rotation of the rotor in the pump cylinders 173. It is also possible to provide other conventional means for connecting the pump pistons 172 and the eccentric piston driving means. Special means for adjusting the degree of eccentricity of the pump piston driving means independently of the eccentricity of the rotary housing ring may also be provided although they are not particularly illustrated in FIGURE 25.

The pump cylinders 173 communicate with the control ports 177 or 236 through the rotor bushing ports 162 and 176 or they are covered by the control web.

The intake of the pump medium and the further passage of the pressure medium proceeds in a manner similar as described with reference to FIGURE 1.

The operation of the pump cylinders 173 is controlled by the control bushing 174 which is provided with the control ports 177 and 236 and the balancing ports 175 and 178 and which is secured against rotation in the rotor bushing 24 by pins 179.

A special feature of the embodiment according to FIGURE 25 also consists of the induction of the mixture of fuel and air through the intake channel 2.

For this reason no special fuel injection device is required and the entire cross-sectional area of the intake channel 2 may be utilized for the induction of the mixture whereby a high rate of induction is possible. After the mixture is compressed, it is passed from the work chambers of the compressor 20 into the control port 67 (FIGURE 2) and it is then forced into the combustion chamber 70. During the continuous operation of the engine the mixture of fuel and air is ignited by the flame 69 within the combustion chamber 70 or in the control port or already in the work chamber if the latter is in communicating connection with the control port 67.

The first ignition at the start may be produced by an ignition device 71, for example, a spark plug or a filament. The necessary energy may be supplied to the ignition device 71 by the ignition lines 180 and 181.

Since neither the compressor rotor nor the releaser rotor is used to act as a pump through the slot chambers 158 (FIGURE 2), the compressor rotor may again be provided with balancing chambers 53 and 89. It may, however, also operate without these chambers if the slot chambers 158 are acted upon as described with reference to the compressor rotor as shown in FIGURE 1.

The provision of the control bushing 174 permits a reduction of the diameter of the main control shaft at the area of the control port, which has the advantage that the leakage of pressure medium and the friction will be reduced. Thus, for example, it is possible with an embodiment as shown in FIGURE 25 to produce a very high pump pressure which may be several times as high as the pressure in the chambers of the lubricating system.

It is possible by the provision of a battery of numerous small engines which all supply their output into common pressure lines to produce many thousands or ten thousands of horsepower for driving big ships.

Figure 21:
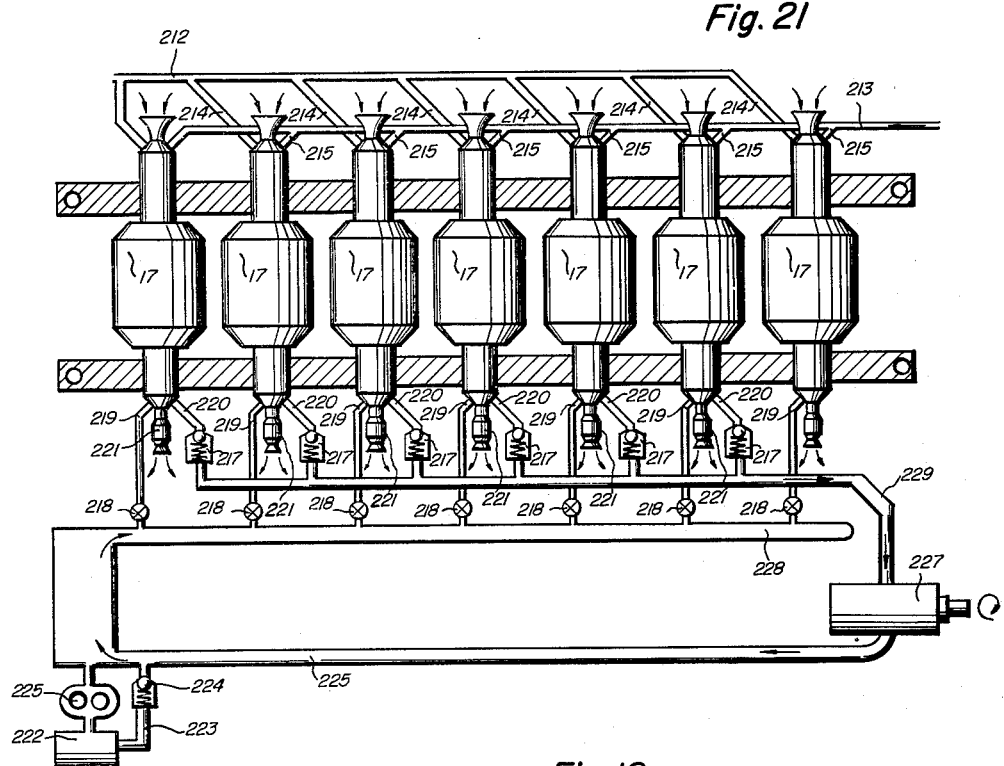
FIGURE 21 shows a diagrammatic view of the combination of several combustion engines according to the invention to form a battery of engines with a common output line for the pressure medium.
Figure 19:
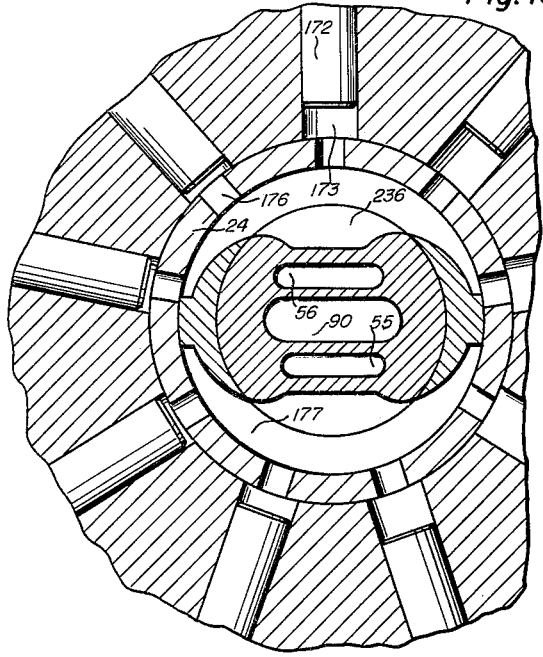
FIGURE 19 shows a cross section taken along line XIX—XIX of FIGURE 25.

The battery of engines as shown in FIGURE 21 is provided with a common feed line 213 for the cooling medium from which lines 215 branch off to each individual engine of which, for example, the rotary housing ring 17 is shown. The individual branch lines 215 may also be provided with shut-off valves to permit one or the other engine to be disconnected. After passing through the individual engines, the coolant may be passed through lines 214 to a common return line 212 in which the coolant of the individual engines may be collected. The individual coolant lines 214 may also be provided with shut-off valves in order to permit one or the other engine to be separated from the coolant system, for example, for repair purposes or the like.

The pump medium for the entire system is contained in an oil tank 222 from which it passes either by self-piming or by priming by means of a pump 225 into the distributing line 228 from which the pump medium is then branched off through individual lines 219 to the individual engines. The current of pressure medium which is produced by the individual engines is delivered therefrom through lines 220 and through check valves 217 into the pressure medium collecting line 229. This line 229 may be connected, for example, to a hydraulic motor such as an oil motor which will thus be driven by the combined pressure currents passing through line 229. The pump medium will then pass from the hydraulic motor 227 through the return line 226 back to tank 222 or into the distributing line 228, or, if the pump medium is inexpensive, for example, water, it may then be discharged to the outside. If a closed circuit is provided, a pressure-release valve 224 may be connected in series with the return line 226 or the distributing line 228. From this pressure-relief valve 224 a return line 223 may lead to the oil tank 222.

The exhaust port of each engine is indicated at 221. The individual pump-medium lines 219 or 220 are preferably provided with shut-off valves 218 which permit one or the other engine to be disconnected from the engine battery, for example, for the purpose for repair or exchange of the engine. By the use of such shut-off valves in the pressure-medium lines it is possible to remove individual engines which require repair within a few minutes from the system and to exchange them for new engines. Individual engines or sets of engines may thus also be stopped at times when a low amount of energy is required by closing the shut-off valves 217, while at times when a great amount of energy is required, for example, at the start, reserve engines may be connected to the driving system by opening the shut-off valves 217.

Figure 22:
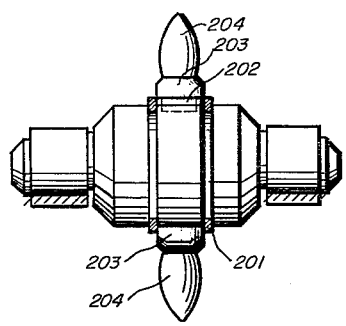
FIGURE 22 illustrates one example of the use of a propeller on the rotary supporting ring of the combustion engine.
Figure 23:
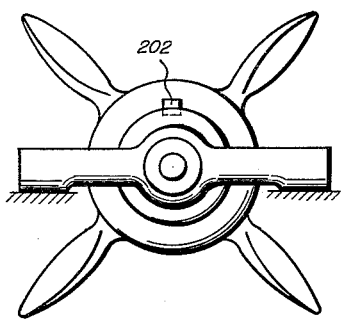
FIGURE 23 shows a side view of FIGURE 22.

FIGURES 22 and 23 illustrate, for example, that the rotary movement of the outer housing ring 17 of the engines may also be utilized directly for driving purposes.

The rotary housing ring 17 may also be utilized for mounting one or more driving means, for example, pulleys, gears propellers, etc., directly thereon. Thus, FIGURES 22 and 23 show how propeller blades 204 may be secured to the rotary housing ring 17 of a combustion engine according to the invention by means of a spline 202, a hub 203, and locking rings 201.

Figure 24:
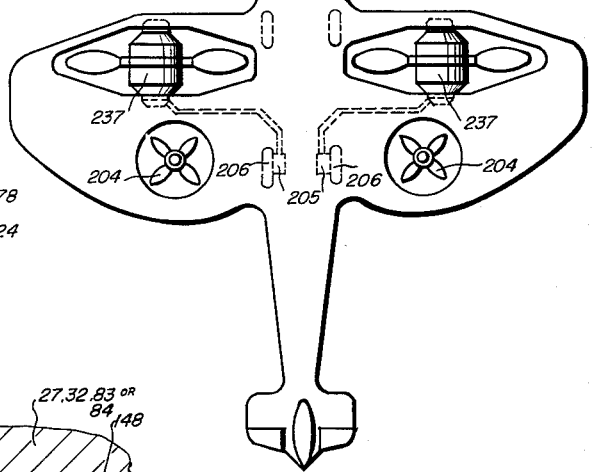
FIGURE 24 illustrates the principle of application of a combustion engine according to the invention, for example, for driving a combined ground vehicle and aircraft.

FIGURE 24 finally illustrates how the combustion engines according to the invention may be applied for a combination of driving purposes. Thus, the rotary housing ring or its side walls may be used for mechanical driving connections, while the pressure currents from the pressure-medium lines may be used for further hydraulic driving purposes. In FIGURE 24 it is illustrated, for example, that the engines 237 carrying propellers on the rotary housing rings are installed in the rings of an airplane for propelling the same. These engines also have connections for supplying the pressure medium through suitable conduits to the hydraulic motors 205 for driving the wheels 206 of the airplane. For the ascent of such an airplane it is also possible to provide additional engines 204 with propellers which act in a vertical or nearly vertical direction. Depending upon the movement of the airplane within the air or along the ground, the main output of the engines 237 may then be transmitted either to the propellers or to the wheels 206 by means of the adjustability of the engines and the adjustability of the pressure-medium currents.

In the three embodiments of the invention as shown in FIGURES 1, 18, and 25, the compressor rotors and the motor rotors are flanged together in the axial direction behind each other by means of the bolts 11. Obviously, it is also possible to provide a different form of connection.

Finally, it is also possible to connect several compressors into one compressor battery which acts upon one or several combustion chambers separately from the compressor. The combustion chamber arrangement may also be spacially separated from the compressor and/or from the motor means, and if several motor means are provided which are supplied, for example, by one combustion chamber, they may, in turn, be combined into one motor battery. The combustion chamber arrangement may then be connected by conduits with the respective channels in the main control shafts.

If desired, the main control shaft may also be divided in a different manner so that the two shaft parts thereof are inserted into the central rotor bore from the opposite axial ends thereof. In order to reduce the length of the combustion chamber, the injection may also occur by the counter-current method. In this case the fuel injection line may, for example, extend through the right part of the main control shaft, as shown in FIGURE 1. Depending upon the geometrical dimensions of the compressor elements, the compression may be driven in the compressor itself to such a high value that self-ignition of the mixture will occur.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A combustion engine of the rotary vane type having at least one rotor unit with a rotor, rotor side walls, a casing ring disposed eccentrically to said rotor, said rotor having slots, a plurality of vanes rotatable along said casing ring and movable in said slots in a substantially radial direction, said vanes together with said side walls and said casing ring defining and enclosing work chambers, and a combustion chamber, comprising a first chamber system in addition to said work chambers for a first medium of a relatively low viscosity, and at least one second additional chamber system for a second medium of a relatively higher viscosity, said two chamber systems being disposed so that both media will act at least indirectly upon said vanes, and pump means for pumping said second medium in said additional chamber system.

2. In a combustion engine of the rotary vane type, in combination, at least one rotor unit comprising movable rotor parts including a rotor having slots, rotor side walls, a casing ring disposed eccentrically to said rotor, and a plurality of vanes mounted for movement in said slots in a substantially radial direction and rotatable along said casing ring, said vanes, said side walls and said casing ring defining and enclosing work chambers for a working medium, said rotor side walls having slots and said vanes having extensions projecting axially into said slots and movable substantially radially within said slots, said side walls extending radially beyond said work chambers so as to surround said casing ring at both end surfaces thereof, said movable parts of said rotor unit forming an additional chamber system partly bounded by said vanes and separated from said work chambers, said chamber system being adapted for a medium having a viscosity higher than the viscosity of the working medium in said work chambers and acting on said vanes, and means for closing said slots in said rotor side walls in the axial and radial directions toward the outside so that radially inner slot chambers are formed radially within said vanes and radially outer slot chambers radially outside of said vanes, said slot chambers forming at least a part of one of said two chamber systems.

3. A combustion engine as defined in claim 2, in which said slot chambers form a part of said second chamber system, in combination with further chambers at both sides of said vane extensions and defined by the lateral surfaces of said vane extensions, and conduit means connecting said further chambers with said work chambers so that said further chambers form a part of said first chamber system.

4. A combustion engine as defined in claim 2 having channel means connecting said radially inner and outer chambers on one vane extension with each other so that said radially inner and outer chambers together with said channel means form a space unit surrounding said vane extensions.

5. A combustion engine of the rotary vane type comprising at least one rotor unit having work chambers therein, a stationary unit within said rotor unit and including a shaft containing a combustion chamber, a stationary supporting frame, means for mounting said stationary unit on said supporting frame, means for rotatably mounting said rotor unit on said supporting frame so that said stationary unit is not acted upon by the bearing forces of said rotor unit, conduit means for conducting a gaseous medium between said combustion chamber and the work chamber of said rotor unit, and control means between said stationary unit and said rotor unit for controlling said gaseous medium, the mounting means for said rotor units comprising a tubular bushing closely surrounding and engaging with said shaft and partly containing said control means, and adapted to control said rotor unit in response to the rotation thereof relative to said shaft.

6. A combustion engine as defined in claim 2, and pump means for producing a current of a pressure medium and being formed by the slots in said rotor and by said rotor side walls, so that a pumping action upon said current of pressure medium is produced by an alternate increase and decrease of the size of said slot chambers.

7. A machine of the rotary vane type having a rotor unit comprising a rotor having side walls, a casing ring disposed eccentrically to said rotor, said rotor having substantially radial slots therein, a plurality of vanes rotatable along said casing ring and slidable in a substantially radial direction within said rotor slots, work chambers between and defined by said vanes, said rotor side walls, and said casing ring, balancing chambers on said vanes, means for supplying media to said balancing chambers, said balancing chambers being disposed around said vanes so that at least a partial pressure balance will be attained on said vanes in a radial direction and peripheral direction relative to the axis of said rotor, said vanes have axial extensions, and said rotor side walls have slots therein for receiving said axial vane extensions so that slot chambers serving as balancing chambers are formed radially inside and radially outside of said vane extensions, means for connecting said radially inner and outer slot chambers with each other for attaining at least a partial pressure balance on said vanes in a radial direction, balancing chambers on the two lateral surfaces of said vane extensions, and means for connecting said balancing chambers in groups with each of the two opposite work chambers adjacent to the respective vane to attain at least a partial pressure balance on said vane in the peripheral direction relative to the rotor axis.

8. A machine of the rotary vane type having a rotor unit comprising a rotor having side walls, a casing ring disposed eccentrically to said rotor, said rotor having substantially radial slots therein, a plurality of vanes rotatable along said casing ring and slidable in a substantially radial direction within said rotor slots, work chambers between and defined by said vanes, said rotor side walls, and said casing ring, balancing chambers on the two lateral surfaces of said vane extensions, means for connecting said balancing chambers in groups with each of the two opposite work chambers adjacent to the respective vane to attain at least a partial pressure balance on said vane in the peripheral direction relative to the rotor axis, and elements forming slides engaging into said balancing chambers on said two lateral surfaces of said vane extensions and adapted alternately to increase and decrease the size of said balancing chambers in response to the movement of said vanes, said balancing chambers being adapted to contain a first fluid medium of lesser viscosity than the viscosity of a second fluid medium by which said vane extensions are adapted to be engaged in radial direction.

9. A machine of the rotary vane type having a rotor unit comprising a rotor having side walls, a casing ring disposed eccentrically to said rotor, said rotor having substantially radial slots therein, a plurality of vanes rotatable along said casing ring and slidable in a substantially radial direction within said rotor slots, work chambers between and defined by said vanes, said rotor side walls, and said casing ring, balancing chambers on said vanes, means for supplying media to said balancing chambers, said balancing chambers being disposed around said vanes so that at least a partial pressure balance will be attained on said vanes in a radial direction and peripheral direction relative to the axis of said rotor, and a guide runner between each vane and said casing ring, said guide runner and said casing ring enclosing a balancing chamber for attaining at least a partial pressure balance on said vane in the radial direction relative to the rotor axis.

10. A machine of the rotary vane type comprising a rotor having side walls, a casing ring disposed eccentrically to said rotor, said rotor having substantially radial slots therein extending into said rotor side walls, a plurality of vanes having extensions thereon engaging into and movable substantially radially within said slots, said rotor, said rotor side walls, said casing ring, and said vanes together defining work chambers, said vane extensions projecting radially beyond said vanes and surrounding said casing ring at both end surfaces thereof, the axially inner end surfaces of said vane extensions facing toward said casing ring being in close engagement with said surfaces of said casing ring, guide runners for said vanes, and means for pivotally connecting said guide runners to said vanes, said guide runners each comprising a runner part having a slide surface in close engagement with and slidable along said casing ring, said runner part having a length corresponding to the distance between the axially inner end surfaces of said vane extensions and tightly fitting between said end surfaces, said guide runners containing recesses in the slide surfaces thereof.

11. In a combustion engine of the rotary vane type, in combination, at least one rotor unit comprising movable rotor parts including a rotor having slots, rotor side walls, a casing ring disposed eccentrically to said rotor, and a plurality of vanes mounted for movement in said slots in a substantially radial direction and rotatable along said casing ring, said vanes, said side walls and said casing ring defining and enclosing work chambers for a working medium, said vanes having cooling channels, said movable parts of said rotor unit forming an additional chamber system partly bounded by said vanes and separated from said work chambers, said chamber system being adapted for a medium having a viscosity higher than the viscosity of the working medium in said work chambers and acting on said vanes.

12. A combustion engine comprising at least one rotor unit having work chambers therein, a stationary unit within said rotor unit and including a shaft containing a combustion chamber, a stationary supporting frame, mounting means for mounting said stationary unit on said supporting frame and including a member having an inner annular face surrounding said shaft, means for rotatably mounting said rotor unit on said supporting frame so that said stationary unit is not under the load of said rotary unit, conduit means for conducting a gaseous medium between said combustion chamber and a work chamber of said rotary unit, and control means between said stationary unit partly located between said member and said shaft and adapted to control said rotor unit in response to the rotation thereof relative to said shaft.

13. A combustion engine as set forth in claim 1 wherein said pump means comprise said vanes, and parts of said slots between said vanes and the surfaces of said slots so that said second medium is pumped in said additional chamber system by the movement of said vanes in said slots.

14. A combustion engine as set forth in claim 1 and including a control member for said rotor unit containing said combustion chamber and having conduits for said first medium and said second medium, and control means on said control member for controlling the supply and discharge of said first and second media, and conduit means for coolant provided in said rotor and in said control member, the supply and discharge of said coolant being controlled by said control means.

15. A combustion engine as set forth in claim 14 wherein said control member has a combustion chamber and is formed with channels adapted to receive said coolant under the control of said control means.

16. A combustion engine having rotor means with contracting and expanding working chambers for compression of a combustion gas and for the expansion of said gas, said rotor means having an additional chamber system forming pumping chambers, and movable means in said pumping chambers varying the volume of said pumping chambers for the intake and discharge of a fluid, said rotor means having inlet port means and outlet port means and inlet passage means and outlet passage means connecting said inlet port means and said outlet port means respectively with said pumping chambers; and control means in one of said passage means for opening and closing said passage means for controlling the amount of fluid pumped into and out of said pumping chambers.

17. A fluid handling machine comprising a stator and a rotor forming expanding and contracting working chambers for a first fluid medium, said rotor being formed with pump chambers for a second fluid medium and including means moving during rotation of said rotor and being at least partly located in said pump chambers for pumping said second fluid medium; conduit means for said first fluid medium connected with said working chambers; inlet passage means and outlet passage means connected with said pump chambers serving for passage of said second fluid medium pumped through said pump chambers; and control means for temporarily closing one of said passage means during rotation of said rotor means.

18. In a vane type rotary fluid handling device, in combination, means including a rotor and forming working chambers periodically increasing and decreasing in volume during rotation of said rotor for compressing or expanding a gas, said rotor having a control face, and being formed with passages extending from a working chamber through a part of said rotor to and through said control face so that gas can be supplied to and discharged from said working chambers, and means adapted to enter at least partially into said passages for filling dead spaces therein.

19. A fluid handling device comprising a supporting housing, a rotor means mounted in said housing for rotation and having working chambers; a cylindrical member extending into said rotor means; actuator means for periodically increasing and decreasing the volume of said working chambers, said rotor means having passage means for passing a fluid to and from said working chambers, and said cylindrical member having passages communicating with said first mentioned passages, said cylindrical member having a rotary control face, and a cavity; a non-rotatable control body extending into said cavity of said cylindrical member and having a stationary cylindrical control face, said control body having passages forming inlet and outlet ports in said stationary control face for passing fluid through said passages, said stationary control space engaging said rotary control face and sliding on the same; flexible mounting means mounting said control body on said stationary housing, said mounting means including two pairs of pins extending perpendicularly to each other, each pin of each pair of pins being disposed geometrically to the other pin of the pair on opposite sides of said control body and being aligned with the respective other pin of said pair; a floating ring means located between said control body and said housing and having bores, said pins projecting into corresponding bores of said floating ring means, a pair of said pins extending into said control body and the other pair of pins extending into said housing, said control body having a part formed with said inlet and outlet ports and being disposed remote from said cylindrical member, said stationary and rotary control faces being spaced at a close clearance to permit relative axial movement of said control faces, and said flexible mounting means enabling spherical and radial movement of said control body to a limited extent so that said stationary control face of said control body can freely follow undesired movements of said rotary control face to a limited extent, said mounting means preventing pivotal movements of said control body around its axis and axial movement of said control body.

References Cited by the Examiner

UNITED STATES PATENTS

| | | | |
|---|---|---|---|
| 2,075,561 | 3/1937 | Wellensiek | 123—8 |
| 2,224,443 | 12/1940 | Maurer et al. | 123—8 |
| 2,345,561 | 4/1944 | Allen | 123—8 |
| 2,511,441 | 6/1950 | Loubiere | 60—39.61 |

FOREIGN PATENTS 149,600  8/1920  Great Britain.

MARK NEWMAN, *Primary Examiner.*

JULIUS E. WEST, SAMUEL LEVINE, DONLEY J. STOCKING, *Examiners.*

R. J. GOMEZ, M. C. KRUSS, W. J. KRAUSS, *Assistant Examiners.*